US008244600B2

(12) United States Patent
Gromek et al.

(10) Patent No.: US 8,244,600 B2
(45) Date of Patent: Aug. 14, 2012

(54) PRESENTATION OF INFORMATION OR REPRESENTATIONS PERTAINING TO DIGITAL PRODUCTS AVAILABLE FOR DIGITAL DISTRIBUTION

(75) Inventors: Monika Gromek, Oakland, CA (US); Joseph Michael Rossell, Mountain View, CA (US); David J. Davis, Jr., Danville, CA (US); Alexandrea Anderson, Clovis, CA (US); Debbie Shimizu, San Jose, CA (US); Elizabeth d'Errco, Redwood City, CA (US); Robert H. Kondrk, Los Angeles, CA (US); Michael Reed, Chapel Hill, NC (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 12/555,585

(22) Filed: Sep. 8, 2009

(65) Prior Publication Data
US 2011/0060666 A1    Mar. 10, 2011

(51) Int. Cl.
*G06Q 30/00* (2006.01)
(52) U.S. Cl. ...................................... 705/27.2
(58) Field of Classification Search ............... 705/26–27
See application file for complete search history.

(56) References Cited

U.S. PATENT DOCUMENTS

| | | | |
|---|---|---|---|
| 7,774,708 B2 | 8/2010 | Bell et al. | |
| 7,831,548 B1 * | 11/2010 | Round et al. | 707/609 |
| 2004/0268451 A1 | 12/2004 | Robbin et al. | |
| 2006/0048056 A1 * | 3/2006 | Huang | 715/719 |
| 2009/0063542 A1 | 3/2009 | Bull et al. | |
| 2009/0063972 A1 | 3/2009 | Ma et al. | |
| 2009/0064057 A1 | 3/2009 | Bull et al. | |
| 2009/0181649 A1 | 7/2009 | Bull et al. | |
| 2009/0182597 A1 | 7/2009 | Bull et al. | |
| 2009/0187491 A1 | 7/2009 | Bull et al. | |
| 2009/0219901 A1 | 9/2009 | Bull et al. | |
| 2010/0161422 A1 * | 6/2010 | Zeevi et al. | 705/14.65 |

FOREIGN PATENT DOCUMENTS

WO    WO 2008071979 A1 *   6/2008

OTHER PUBLICATIONS

Ellerin, Stephen, "Ulead Media Studio Pro 6.0" (EMedia Magazine Oct. 2001, vol. 14, iss. 10, pp. 52-55).*

* cited by examiner

*Primary Examiner* — Adam Levine
*Assistant Examiner* — Ethan D Civan

(57) ABSTRACT

Improved methods, systems, graphical user interfaces and computer program code for presenting representations or information concerning digital products are disclosed. The representations of digital products can serve to promote certain digital products at an online digital product distribution site. Information concerning a particular digital product can be rapidly accessible from a displayed page at an online digital product distribution site referencing a plurality of different digital products. According to one aspect, a plurality of representations (e.g., images) can be dynamically presented to facilitate access to corresponding digital product information. The representations being presented can be automatically changed on a periodic basis, unless user interaction requests otherwise. According to another aspect, digital product information can be presented in an overlay window that can be initiated by a user and present relevant information concerning a digital product. Advantageously, digital product information can be quickly presented to a user without having to navigate to a new page of an online distribution site.

14 Claims, 19 Drawing Sheets

PRESENTATION OF INFORMATION OR REPRESENTATIONS PERTAINING TO DIGITAL PRODUCTS AVAILABLE FOR DIGITAL DISTRIBUTION

BACKGROUND OF THE INVENTION

1. Field of the Invention

The present invention relates to presentment of information or representations of digital products, such as digital media assets, available from a remote repository.

2. Description of the Related Art

In recent years, advanced online media distribution sites, such as iTunes™ media store, have offered online distribution of digital media assets, such as songs, movies, podcasts, television shows and application programs. Users can access online media distribution sites using a network browser or other browser-like application program (e.g., iTunes™ application program). However, given that media distribution sites host a large number of different digital media assets, navigation can be cumbersome and require navigation through several pages before locating a media asset of interest. Thus, there is a need for improved techniques to present digital products and streamline navigation at media distribution sites so that information of interest is more readily available.

Additionally, online media distribution sites often desire to promote particular digital media assets. While digital media assets can be prominently displayed on a web page of an online media distribution site, there is a continuing need for improved approaches to promoting particular digital media assets to users at online media distribution sites.

SUMMARY

The invention pertains to improved methods, systems, graphical user interfaces and computer program code for presenting representations or information concerning digital products. The representations of digital products can serve to promote certain digital products at an online digital product distribution site. Information concerning a particular digital product can be rapidly accessible from a displayed page at an online digital product distribution site referencing a plurality of different digital products.

According to one aspect, a plurality of representations (e.g., images) can be dynamically presented to facilitate access to corresponding digital product information. The representations being presented can be automatically changed on a periodic basis, unless user interaction requests otherwise.

According to another aspect, digital product information can be presented in an overlay window. A user can initiate display of an overlay window and the overlay window can present relevant information concerning a digital product. Advantageously, digital product information can be quickly presented to a user without having to navigate to a new page of an online distribution site (e.g., online store).

The invention can be implemented in numerous ways, including as a method, system, device, apparatus (including computer readable medium and graphical user interface). Several embodiments of the invention are discussed below.

As a method for presenting digital media assets on a display screen associated with a computing device, one embodiment of the invention can, for example, include at least: identifying a presentation region on the display screen; displaying a first graphical image on a primary portion of the presentation region on the display screen, the first graphical image pertaining to a first digital media asset; displaying a plurality of graphical images on a secondary portion of the presentation region on the display screen, each of the plurality of graphical images pertaining to a digital media asset; and automatically advancing through the graphical images being displayed on the secondary portion of the presentation region of the display screen.

As a computer readable medium including at least executable computer program stored thereon for presenting digital assets on a display screen associated with a computing device, one embodiment of the invention can, for example, include at least: computer program code for identifying a presentation region on the display screen; computer program code for displaying a first graphical image on a primary portion of the presentation region on the display screen, the first graphical image pertaining to a first digital asset; computer program code for displaying a plurality of graphical images on a secondary portion of the presentation region on the display screen, each of the plurality of graphical images pertaining to a digital asset; and computer program code for automatically advancing through the graphical images being displayed on the secondary portion of the presentation region of the display screen.

As a computing device, one embodiment of the invention can, for example, include at least: a display device configured to present a display screen; a user input device configured to received a user input; a processor coupled to the display device and the user input device, and being configured to execute computer program code to select and present graphical images on the display screen of the display device; and a data storage device configured to store the computer program code for execution by the processor. The computer program code can include at least: computer program code for identifying a presentation region on the display screen; computer program code for displaying a first graphical image on a primary portion of the presentation region on the display screen, the first graphical image pertaining to a first digital asset; computer program code for displaying a plurality of graphical images on a secondary portion of the presentation region on the display screen, each of the plurality of graphical images pertaining to a digital asset; and computer program code for automatically advancing through the graphical images being displayed on the secondary portion of the presentation region of the display screen.

As a method for presenting media asset information on a display screen associated with a computing device, one embodiment of the invention includes at least: displaying a plurality of graphical images representing digital media assets in a base window on the display screen; detecting a user input over a particular one of the graphical images being displayed; and displaying an overlay window over a portion of the base window when the user input associating the pointing action has been detected over the particular one of the graphical images. The overlay window can display information concerning a particular digital media asset that is associated with the particular one of the graphical images over which the pointing action has been detected, and wherein the overlay window includes at least: asset descriptive information, at least one acquisition control, and a media content region.

As a method for presenting digital product information on a display screen of a computing device, one embodiment of the invention can, for example, include at least: displaying a plurality of digital product representations on a base window of the display screen; determining whether a user input hovers over a particular one of the digital product representations being displayed; displaying an information request control on or proximate to the particular one of the digital product representations; subsequently receiving a user selection of the information request control; requesting product information from a remote server in response to the user selection of the information request control; receiving the product information from the remote server; and displaying an interactive overlay window containing the product information.

As a computer readable medium including at least computer program code stored thereon for presenting digital product information on a display screen of a computing device, one embodiment of the invention includes at least: computer program code for displaying a plurality of digital product representations on a base window of the display screen; computer program code for determining whether a user input hovers over a particular one of the digital product representations being displayed; computer program code for displaying an information request control on the particular one of the digital product representations; computer program code for receiving a selection of the information request control; computer program code for requesting product information from a remote server in response to the selection of the information request control; computer program code for receiving the product information from the remote server; and computer program code for displaying an interactive overlay window containing the product information.

As a computing device, one embodiment of the invention includes at least: a display device configured to present a display screen; a user input device configured to received a user input; a processor coupled to the display device and the user input device, and being configured to execute computer program code to present digital product information on the display screen of the display device; and a data storage device configured to store the computer program code for execution by the processor. The computer program code including at least: computer program code for displaying a plurality of digital product representations on a base window of the display screen; computer program code for determining whether a user input hovers over a particular one of the digital product representations being displayed; computer program code for displaying an information request control on the particular one of the digital product representations; computer program code for receiving a selection of the information request control; computer program code for requesting product information from a remote server in response to the selection of the information request control; computer program code for receiving the product information from the remote server; and computer program code for displaying an interactive overlay window containing the product information.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

The invention pertains to improved methods, systems, graphical user interfaces and computer program code for presenting representations or information concerning digital products. The representations can serve to promote certain digital products. Information concerning a particular digital product can be rapidly accessible from a displayed page referencing a plurality of different digital products.

According to one aspect, a plurality of representations (e.g., images) can be dynamically presented to facilitate access to corresponding digital product information. The representations can be changed on a periodic basis, unless user interaction requests otherwise.

According to another aspect, digital product information can be presented in an overlay window. A user can initiate display an overlay window and the overlay window can present relevant information concerning a digital product. Advantageously, digital product information can be quickly presented to a user without having to navigate to a new page of an online distribution site (e.g., online store).

Digital products can, for example, include digital media assets or computer program products. The digital media assets (i.e., digital media items or media items) can pertain to video items (e.g., movies, music videos, television shows), audio items (e.g., songs (music), podcasts or audiobooks), or image items (e.g., photos). The digital products can include collections of digital media assets. Computer program products can pertain to applications (or application programs), animations, or presentations.

Several embodiments of the invention are discussed below with reference to FIGS. 1-11J. However, those skilled in the art will readily appreciate that the detailed description given herein with respect to these figures is for explanatory purposes as the invention extends beyond these limited embodiments.

Figure 1:
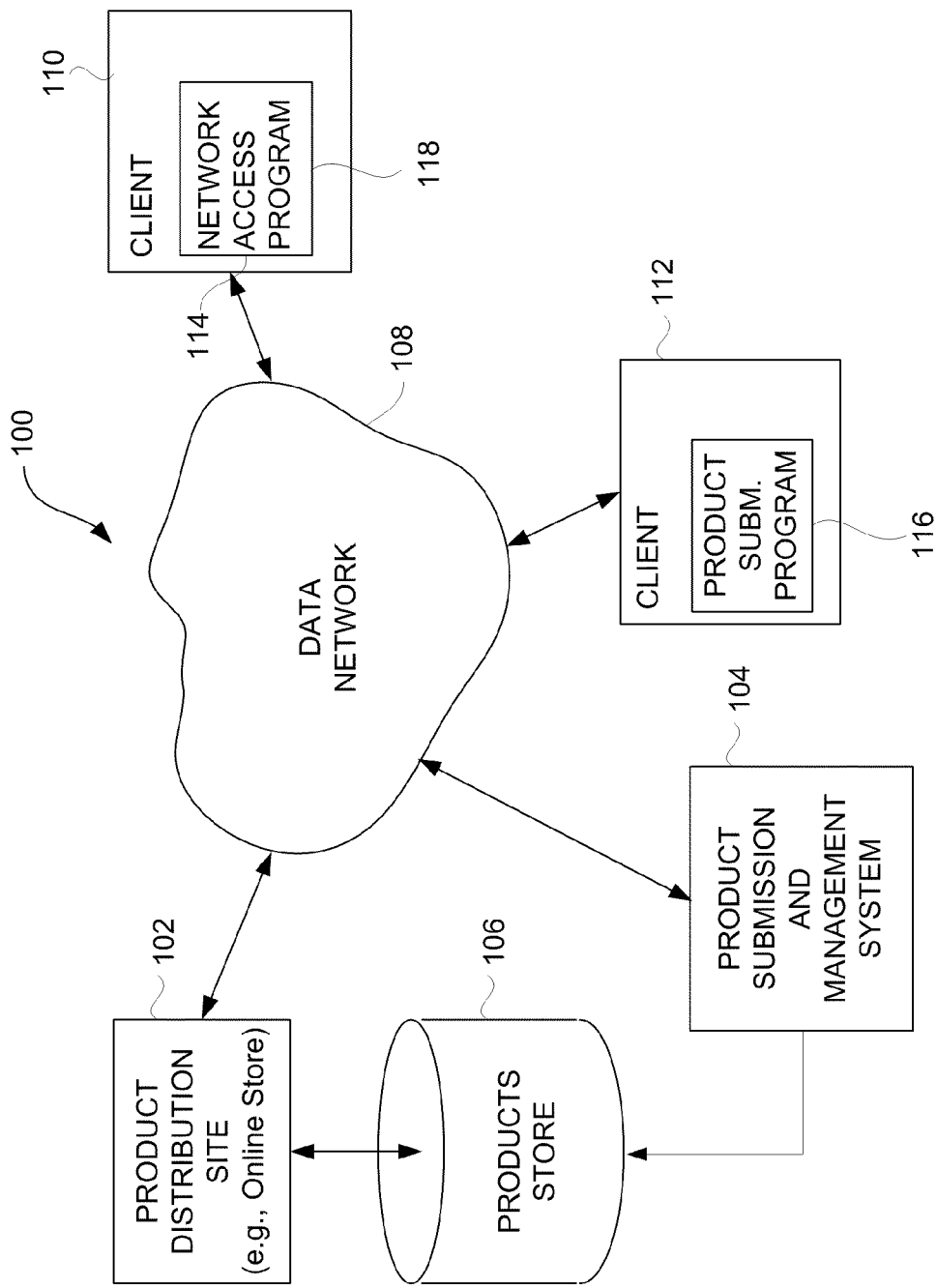
FIG. 1 is a block diagram of a product submission and distribution system according to one embodiment.

FIG. 1 is a block diagram of a product submission and distribution system 100 according to one embodiment. The product submission and distribution system 100 includes a product distribution site 102. The product distribution site 102 provides an online access point for distribution of various digital products. For example, the product distribution site 102 can be referred to as an online store. A product submission and management system 104 operates to receive submissions of digital products from various digital product submitters. The product submission and management system 104 can process submission of digital products and authorize distribution of approved digital products. The digital products can be stored in a products store 106. In one embodiment, the products store 106 includes a mass data store and one or more databases. The products store 106 provides mass storage of the numerous digital products that are available for distribution (e.g., purchase or rental). For example, digital products that have been purchased can be accessed from the products store 106 over a data network 108 by way of the product distribution site 102. Examples of digital products are media items or computer program products. Media items can pertain to music (e.g., songs or albums) or video (e.g., movies, music videos or television shows). Computer program products can pertain to applications (or application programs), animations, or presentations.

The product submission and distribution system 100 also includes a first client 110 and a second client 112. The first client 110 and the second client 112 are client devices, such as computing devices. A computing device can, for example be a personal computer (e.g., desktop computer, notebook computer, netbook computer), a portable electronic device (e.g., PDA, smart phone), some other computing device that can provide the functions described herein (e.g., storing and presenting media to their users). Typically, the product submission and distribution system 100 would include a plurality of different clients 110, 112. The first client 110 includes a network access program 114. The second client 112 includes a product submission program 116. Some clients can also include both the network access program 114 and the product submission program 116.

The network access program 114 is an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 is coupled to the product distribution site 102 through the data network 108. Hence, any of the first clients 110 can interact with the product distribution site 102 to review, purchase, execute, play and/or manage digital products.

In the product submission and distribution system 100 shown in FIG. 1, the digital products are submitted to the product submission and management system 104 by way of the product submission program 116. The digital products that have been submitted (e.g., via the second client 112 are processed and then stored in the products store 106. Thereafter, the stored digital products are available to be purchased from the product distribution site 102. Upon purchasing a particular digital product, the product distribution site 102 permits the digital data for the particular digital product to be retrieved from the products store 106 and then delivered (e.g., downloaded) from the product distribution site 102 to the requesting client 110 through the data network 108. In this regard, the product distribution site 102 or some other delivery server (not shown) obtains the digital data corresponding to the particular digital product from the products store 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital product at the client 110.

The product submission and distribution system 100 allows a user of the client 110 to utilize the network access program 114 to browse, search or sort through a plurality of digital products that can be purchased from the product distribution site 102. The network access program 114 may also allow the user to preview or demo some or all of a digital product. In the event that the user of the network access program 114 desires to purchase a particular digital product, the user (via the network access program 114) and the product distribution site 102 can engage in an online commerce transaction in which the user pays for access rights to the particular digital product. In one embodiment, a credit card associated with the user is credited for a purchase or rental amount of the particular digital product.

The submission and purchase of the digital products can be achieved over the data network 108. In other words, the submission and purchase of the digital products can be achieved online. The purchase of media items online can also be referred to as electronic commerce (e-commerce). In one embodiment, the data network 108 includes at least a portion of the Internet. In one embodiment, the connections through the data network 108 between the product distribution site 102 and the clients 110, 112 can be through secure connections, such as Secure Sockets Layer (SSL).

According to one aspect, a plurality of representations (e.g., images) can be dynamically presented to facilitate access to corresponding digital product information. The representations can be changed on a periodic basis, unless user interaction requests otherwise.

Figure 2:
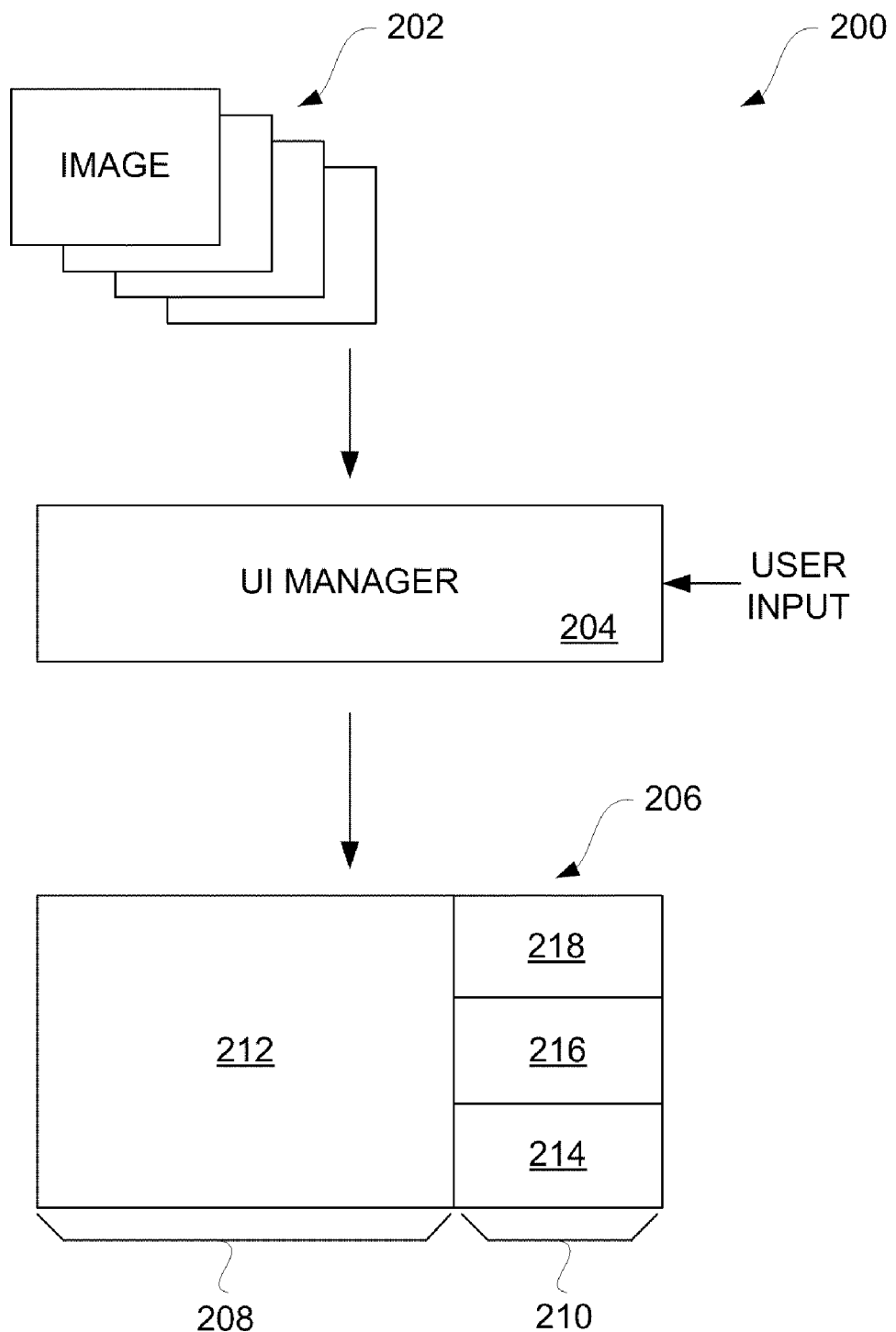
FIG. 2 is a digital asset presentation system according to one embodiment.

FIG. 2 is a digital asset presentation system 200 according to one embodiment. The digital asset presentation system 200 receives a plurality of images 202. Each of the images correspond to and represent a particular digital product. For example, the particular digital product can, for example, be digital media assets. The digital asset presentation system 200 also includes a user interface (UI) manager 204. The UI manager 204 receives the images 202 and can also receive a user input. The UI manager 204 can control the presentation of a graphical user interface 206 on a display screen of a client device. The graphical user interface 206 presents a plurality of the images 202 in a display region (e.g., window, pane or section) on the display screen of the client device. In one embodiment, as shown in FIG. 2, the display region can include a primary portion 208 and a secondary portion 210. The primary portion 208 provides a primary slot 212 for one of the images 202, which can be denoted as a primary image. The secondary portion 210 includes a plurality of secondary slots 214, 216 and 218. Each of the secondary slots 214, 216 and 218 can display one of the images 202, where such images can be denoted as secondary images. Typically, the number of images 202 being received by the UI manager 204 exceeds the number of images that can be concurrently displayed on the graphical user interface 206. Accordingly, in one embodiment, the images 206 being displayed on the graphical a user interface 206 under the control of the UI manager 204 are periodically cycled. In one embodiment, the UI manager 204 causes the images 202 to be periodically cycled through the graphical user interface 206. In such case, the UI manager 204 automatically (or dynamically) causes the images to change on a periodic basis (e.g., every 4 seconds). In another embodiment, the images 202 being displayed in the graphical user interface 206 can be manually cycled through use of user input provided to the UI manager 204.

In one embodiment, the cycling of the images 202 through the slots 212-218 can be performed in an incremental manner. For example, in the embodiment shown in FIG. 2, four (4) images can be presented in the graphical user interface 206. Every cycle one of the currently displayed images can be removed from the graphical user interface 206 while a new one of the images 202 can be added to the graphical user interface 206. For example, Table I below illustrates a current set of displayed images in the slots 212-218 of the graphical user interface 206.

TABLE I

| 212 | A |
|-----|---|
| 214 | B |
| 216 | C |
| 216 | D |

Table II below illustrates a next set of displayed images in the slots 212-218 of the graphical user interface 206 following a single cycle after the current set of displayed images shown in Table I. Note that as noted in Table II image A is no longer presented, images B, C and D have shifted slots, and new image E is now displayed.

TABLE II

| 212 | B |
|-----|---|
| 214 | C |
| 216 | D |
| 216 | E |

It should also be noted that for performance reasons each of the images that can be presented in the graphical user interface 206 in multiple formats, such as a large format for a primary image or a small format for a secondary format. For example, slot 212 can use the large format image, while slots 214-216 can use the small format images. The different formats can have different aspect ratio, size and/or resolution. Hence, when an image is to be presented in the graphical user interface, the appropriate sized image can be retrieved and presented in an efficient manner. Alternatively or additionally, the images can be scaled for appropriate display.

As previously noted, the images being displayed in a graphical user interface, such as the graphical user interface 206, can represent digital products. Hence, to assist users in accessing product information, each of the images presented in the slots can link to product information. The product information can pertain to product pages that contain information concerning the corresponding digital product.

Figure 3:
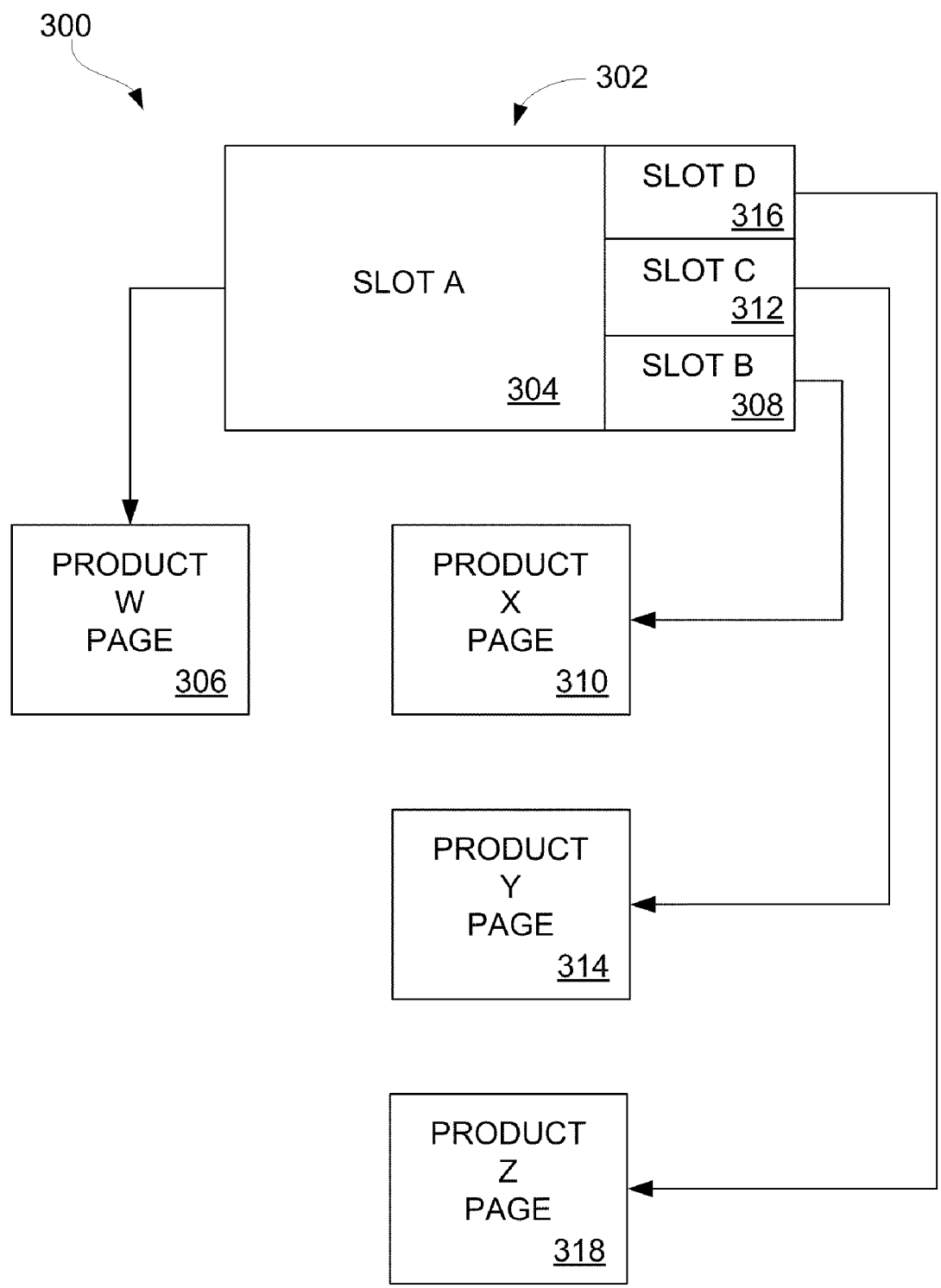
FIG. 3 illustrates a block diagram of a digital product access system according to one embodiment.

FIG. 3 illustrates a block diagram of a digital product access system 300 according to one embodiment. The digital product access system 300 includes a graphical user interface 302. The graphical user interface 302 includes slot A 304, representing a primary slot. An image can be displayed in the slot A 304. If a user of the computing device selects the image displayed in the region associated with the slot A 304, a product W page 306 can be presented on the display screen. Typically, the product W page 306 will replace the graphical user interface 302 on the display screen. The product W page 306 presents product information that is associated the image displayed in the slot 304. The graphical user interface 302 also includes slot B 308, slot C 312 and slot D 316, which can represent secondary slots. Images can be displayed in each of slot B 308, slot C 312 and slot D 316. If the user of the computing device presenting the graphical user interface 302 selects the slot B 308, a product X page 310 can be presented on the display screen. If the user of the computing device presenting the graphical user interface 302 selects the slot C 312, a product Y page 314 can be presented on the display screen. If the user of the computing device presenting the graphical user interface 302 selects the slot D 316, a product Z page 318 can be presented on the display screen.

Figure 4A:
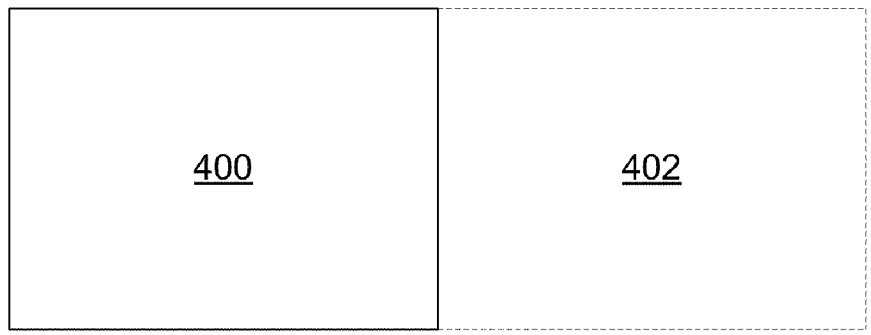
FIGS. 4A-4C illustrate exemplary dynamic image presentment of images of different sizes depending on display screen size.
Figure 4B:
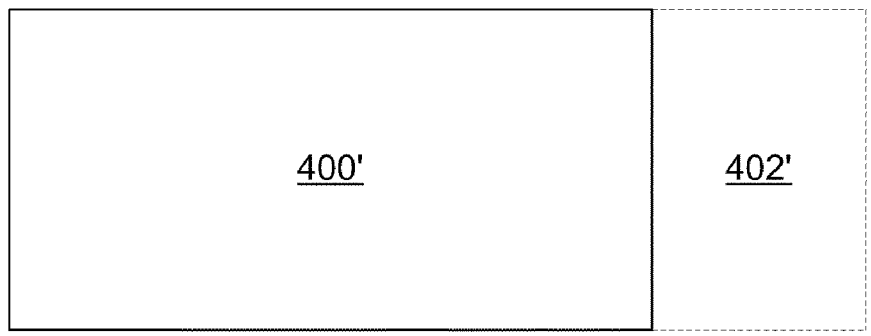
Figure 4C:
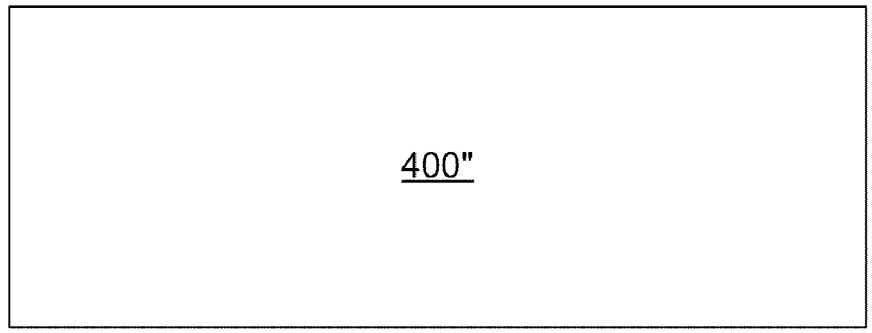

The graphical user interface 206 can also be dynamically scalable depending on the size of the display screen. To accommodate different display screens as well as resizing of application windows, the primary image displayed in the slot 212 and/or one or more of the secondary images in clots 308, 312 and 316 can be resized. In one implementation, the resizing can be achieved by cropping or hiding portions the corresponding image. FIGS. 4A-4C illustrate exemplary dynamic image presentment of images of different sizes depending on display screen size.

FIG. 4A illustrates an exposed display screen 400 and a hidden display portion 402 according to one embodiment. The exposed display screen 400 has a reduced size. In this embodiment, the right side of the image is cropped or hidden. In other embodiments, one or more other sides of image can be cropped or hidden. For example, the image can be provided in the exposed display screen 400 in the reduced size whereby a remaining portion of the image is hidden in the hidden display portion 402 hidden.

FIG. 4B illustrates an exposed display screen 400' and a hidden display portion 402' according to one embodiment. The exposed display screen 400' is an intermediate size. The image can be provided in the exposed display screen 400' in the intermediate size whereby a remaining portion of the image is hidden in the hidden display portion 402 hidden.

FIG. 4C illustrates an exposed display screen 400". The exposed display screen 400' is a full size presentation according to one embodiment. The image can be provided in the exposed display screen 400" in the full size and can leave no portion hidden.

Figure 5:
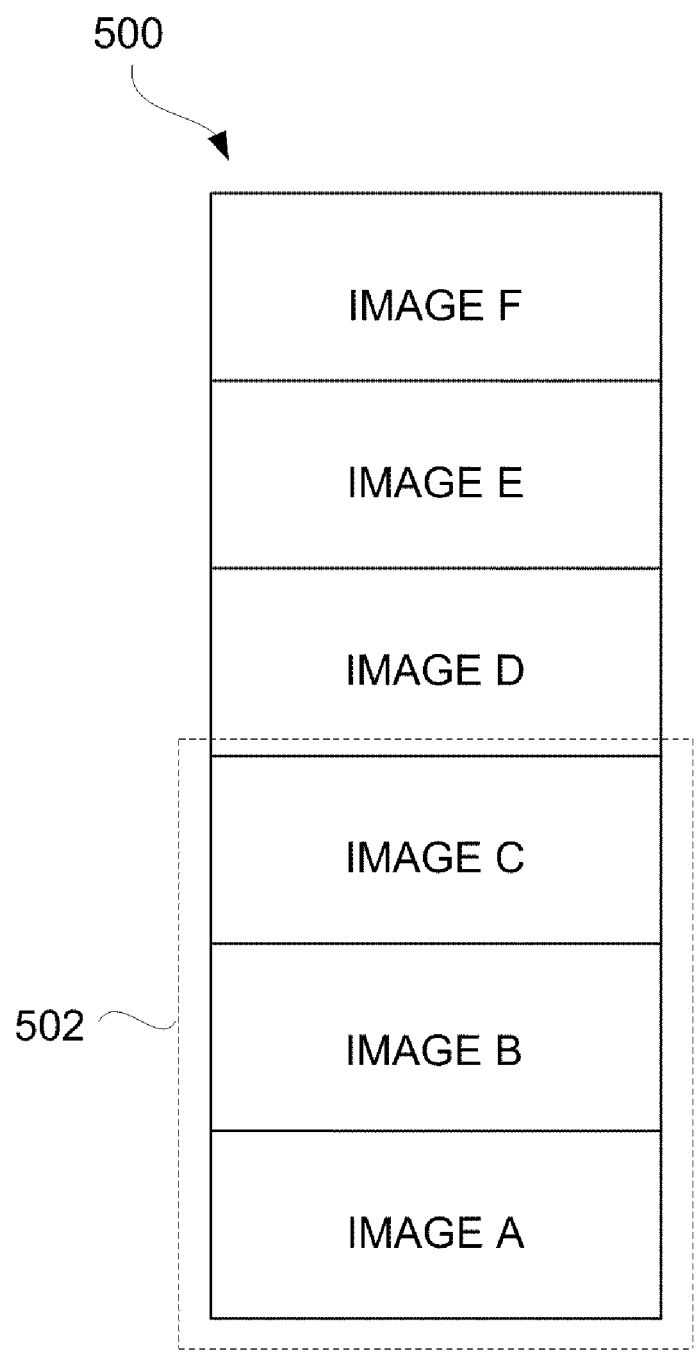
FIG. 5 illustrates an image stack according to one embodiment.

FIG. 5 illustrates an image stack 500 according to one embodiment. The image stack 500 can be an arrangement of images that can be used to advance through a display region 502 of a display screen. For example, the display region 502 can correspond to the secondary portion 210 of the graphical user interface 206. As the images are automatically or manually advanced through the display region 502. The image stack 500 includes images A-F, with the images A, B and C initially presented in the display region 502. On a next advancement, the image stack 500 can slide downward one image such that the image B, C and D are presented in the display region 502. As noted above, the advancement of the images can be animated, such as by a sliding transition effect. Using the image stack 500 facilitates efficient display of images and supports the sliding transition effect.

Figure 6:
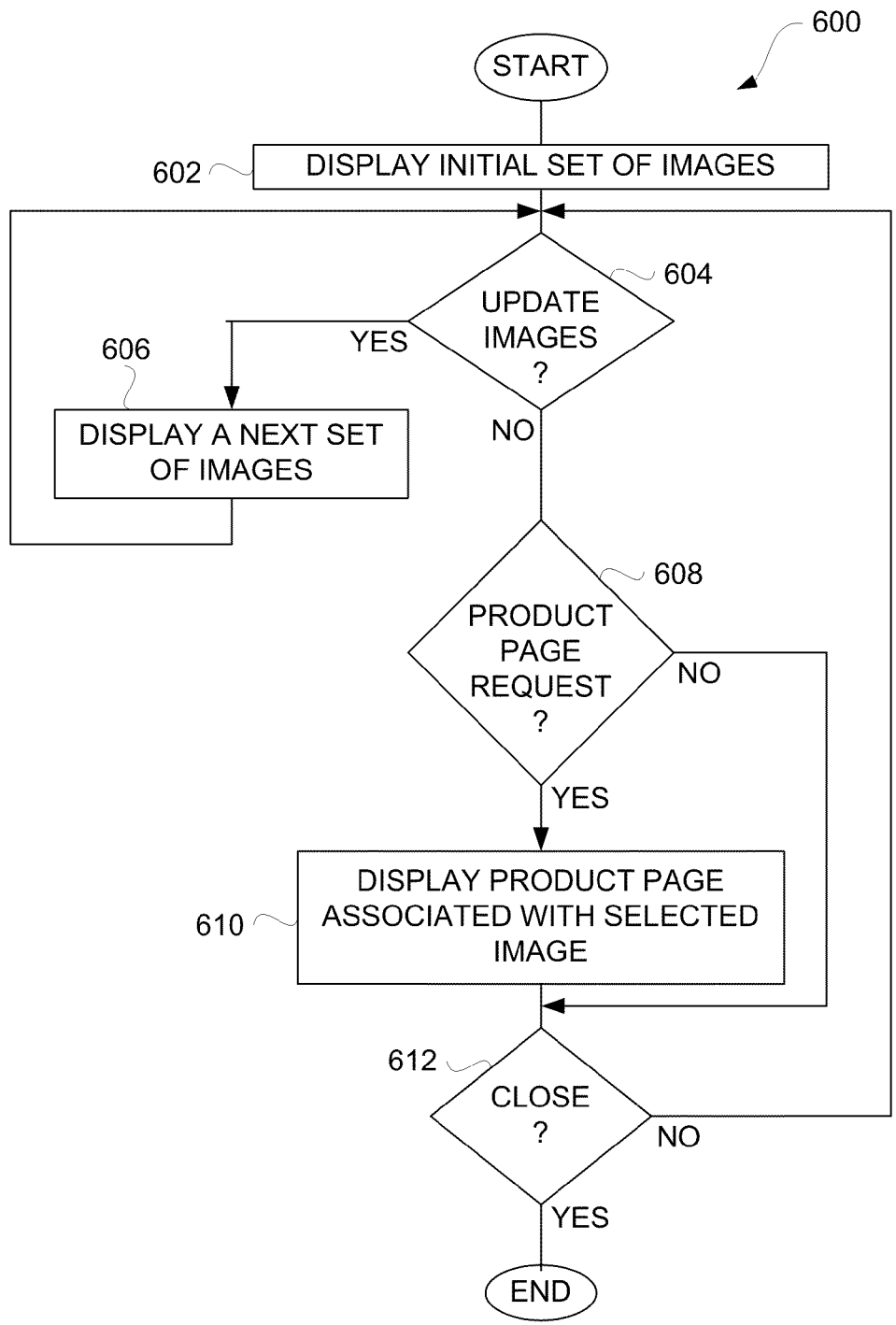
FIG. 6 is a flow diagram of a visual presentation process according to one embodiment.

FIG. 6 is a flow diagram of a visual presentation process 600 according to one embodiment. The visual presentation process 600 can be performed by a computing device, such as the client 110 illustrated in FIG. 1.

The visual presentation process 600 can display 602 an initial set of images. The images in the initial set of images can each represent a different digital asset. The digital assets can, for example, pertain to digital media assets. As discussed above, the initial set of images can be displayed 602 such that one of the images is displayed in a primary portion of a display region, while the remaining images are displayed in a secondary portion of the display region. After the initial set of images are displayed 602, a decision 604 can determine whether the images being displayed should be updated. When the decision 604 determines that the images being displayed should be updated, a next set of images can be displayed 606. The next set of images being displayed 606 can replace the initial set of images that were previously displayed 602. In one embodiment, not all of the images within the next set of images are different than the images of the initial set (or prior set) of images. For example, in one embodiment, only one of the images within the next set of images is different than the images of the initial set (or prior set) of images. After the next set of images is displayed 606, the visual presentation process 600 can return to repeat the decision 604 so that the set of images being displayed can be again updated. In one embodiment, the set of images being displayed can be updated on a periodic basis. For example, the images could be updated every n seconds (n=4, for example).

On the other hand, when the decision 604 determines that the images being displayed should not be updated, a decision 608 can determine whether a product page request has been received. A product page is an informational page that can be presented on a display screen of the client device, thereby providing information about a particular product. The particular product is a digital product that is associated with the corresponding image of the set of images. In one embodiment, the product page request is initiated in response to a user selection of the corresponding image from the set of images being displayed. When the decision 608 determines that a product page request has been received, a product page associated with the selected image can be displayed 610. Alternatively, when the decision 608 determines that a product page request has not been received, the block 610 can be bypassed. Following the block 610 or its being bypassed, a decision 612 can determine whether the visual presentation process 600 should close (end). When the decision 612 determines that the visual presentation process 600 should not close, the visual presentation process 600 returns to repeat the block 604 and subsequent blocks so that another set of updated images can be displayed and/or another product page request can be displayed. On the other hand, when the decision 612 determines that the visual presentation process 600 should close, the visual presentation process 600 can end.

Figure 7:
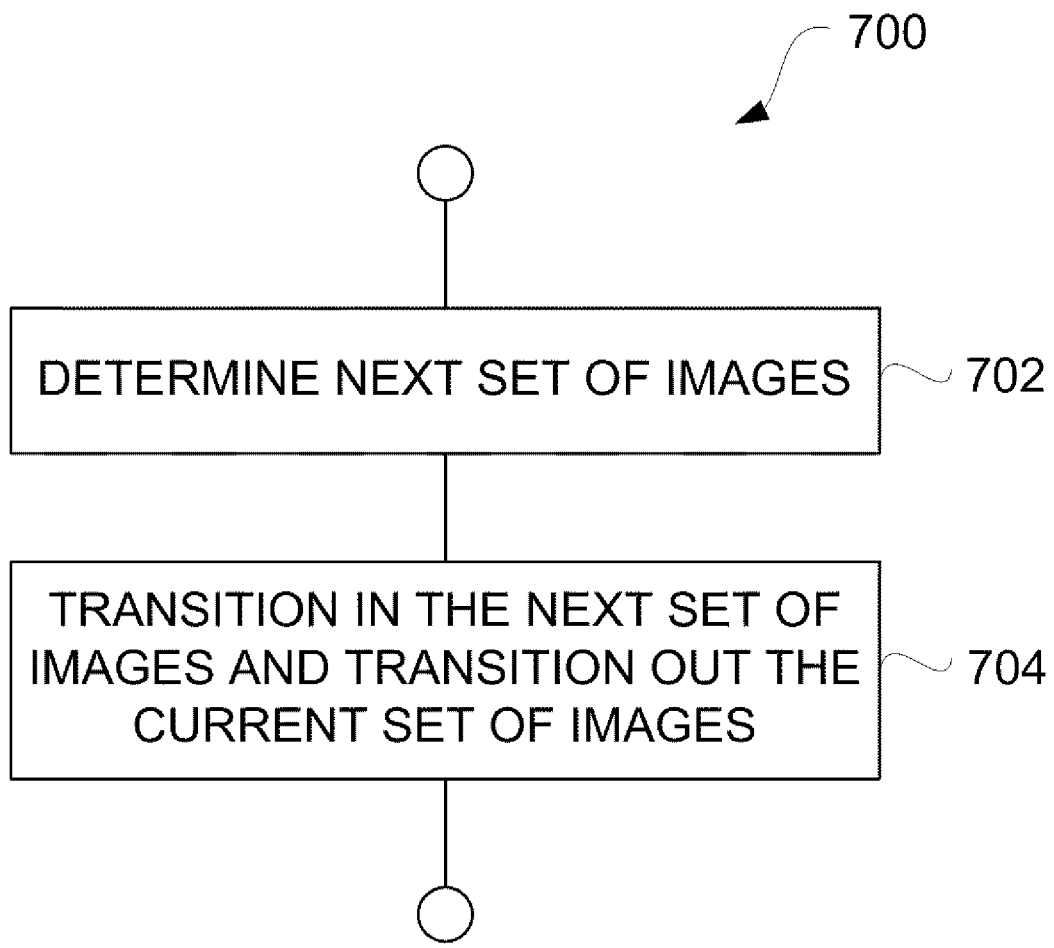
FIG. 7 is a flow diagram of an image display process according to one embodiment.

FIG. 7 is a flow diagram of an image display process 700 according to one embodiment. The image display process 700 is, for example, processing performed by the block 606 of the visual presentation process 600 illustrated in FIG. 6. The image display process 700 can determine 702 a next set of images to be displayed. Here, the next set of images can be automatically determined or determined in accordance with user input. In either case, the next set of images is usually only partially different from the current set of images. Even so, in one embodiment, each of the images in the next set of images are positionally moved relative to the images in the current set of images. Further, after the next set of images are determined 702, the next set of images can be transitioned in while in the current set of images are transitioned out 704. Consequently, the transition between the next set of images and the current set of images can be aesthetically pleasing by use of a transition effect. Typically, the transition effect imposes an animation on the transition. The transition effect can be composed of one or more transition effects. In other words, the transition effects can be similarly utilized separately or in combination. Examples of transition effects, which are animated transitions, include dissolve, push, fade, uncover, wipe, rotation, slide, etc.

Although the image display process 700 makes use of fading as its transition effect, it should be understood that other transition effects can be similarly utilized separately or in combination. For example, the transition effect could instead be a dissolve, push, fade, uncover, wipe, rotation, slide, etc.

Figure 8:
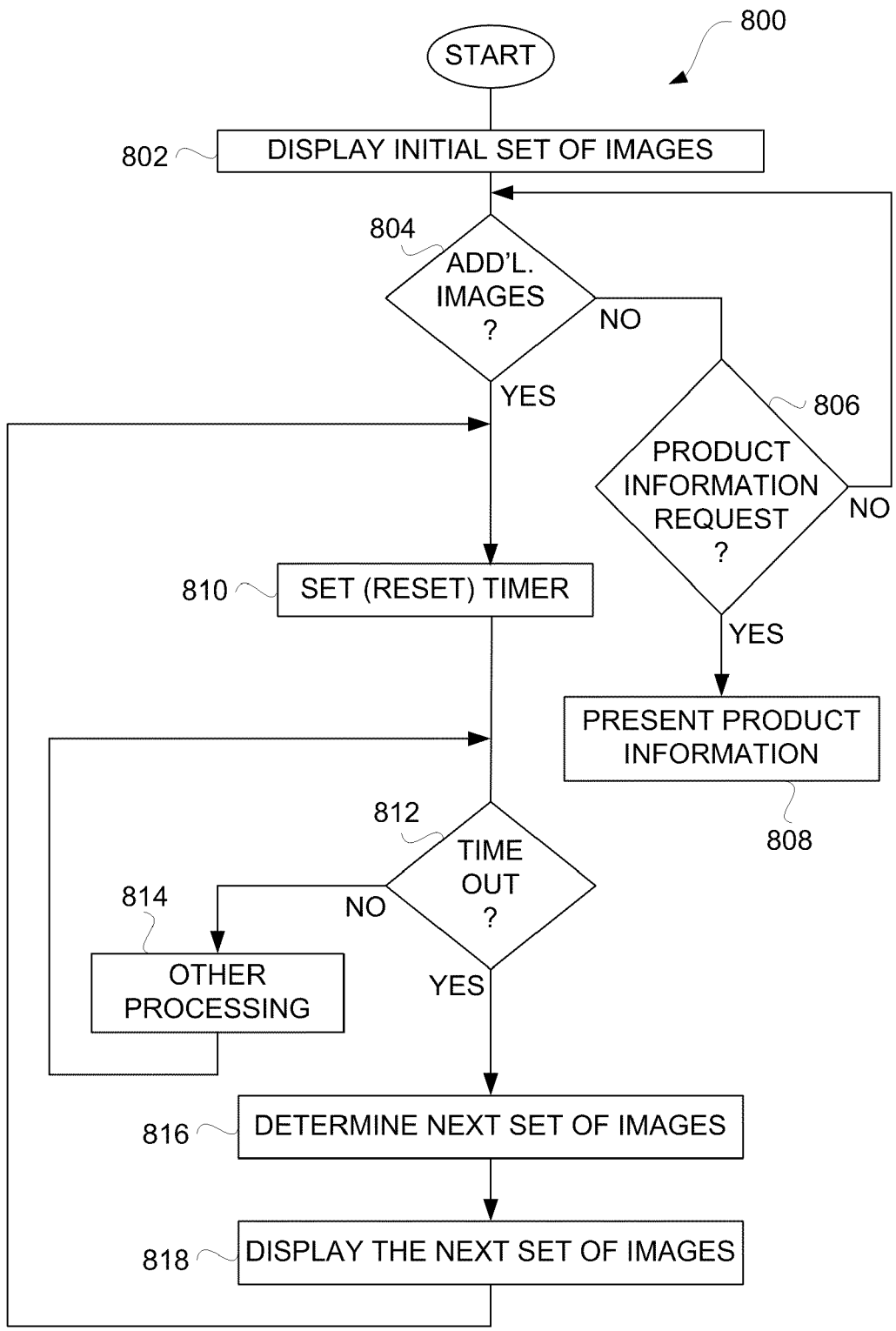
FIG. 8 is a flow diagram of a visual presentation process according to one embodiment.

FIG. 8 is a flow diagram of a visual presentation process 800 according to one embodiment. The visual presentation process 800 can, for example, be performed by a computing device.

The visual presentation process 800 can display 802 an initial set of images. The initial set of images can be displayed on a display screen of a computing device (e.g., client 110). The initial set of images can include a plurality of images that correspond to digital products, namely, digital media assets. A decision 804 can then determine whether there are additional images to be presented beyond those images within the initial set of images. Typically, the initial set of images as well as any additional images are requested and retrieved from a remote server (e.g., media commerce server 102). When the decision 804 determines that there are no additional images, a decision 806 can determine whether a product information request has been received. When the decision 806 determines that a product information request has been received, product information can be presented 808. Thereafter, other processing can be performed associated with the product information that has been presented 808, such other processing is dependent upon the particular type of product information being presented and is not further discussed herein. Alternatively, when the decision 806 determines that a product information request not been received, the visual presentation process 800 can return to repeat the block 804.

On the other hand, when the decision 804 determines that there are additional images to be presented beyond those images within the initial set of images, a timer can be set 810. The timer provides a period of time for advancing images within the set of images being displayed, as further discussed below. After the timer has been set 810, a decision 812 can determine whether a time-out has occurred. For example, the timer can be set 810 to a numeric value and then the timer counts down. When the timer reaches zero (0), the timer can be considered to have timed-out. When the decision 812 determines that the timer has not yet timed-out, other processing 814 can be performed while the timer is counting down. The other processing can depending upon implementation but can permit users to interact in other ways with information displayed on the display screen of the computing device.

Alternatively, when the decision 812 determines that a time-out has occurred, a next set of images can be determined 816. In one embodiment, the next set of images can result from advancing one or more images with respect to a current set of images. After the next set of images has been determined 816, the next set of images can be displayed 818. Here, when the next set of images are displayed 818, one or more of the images from the initial set of images (or the prior set of images) are replaced by corresponding one or more images from the next set of images. Following the block 818, the visual presentation process 800 can return to repeat the block 810 and subsequent blocks so that the images can be periodically advanced and so that other processing can be performed.

Figure 9:
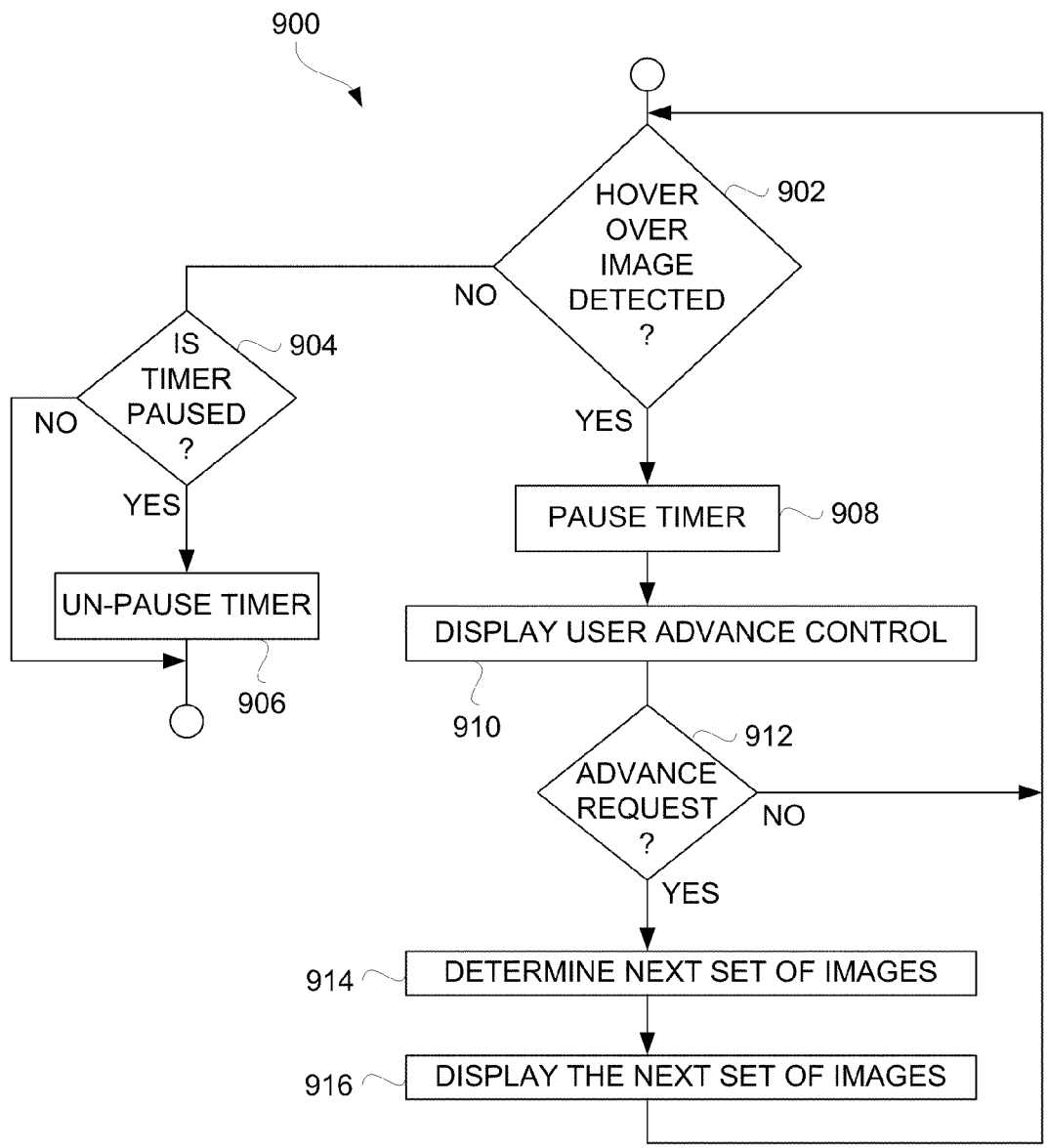
FIG. 9 is a flow diagram of additional processing that can be performed according to one embodiment.

FIG. 9 is a flow diagram of additional processing 900 that can be performed according to one embodiment. The additional processing 900 can, for example, be the processing performed by the block 814 of the visual presentation process 800 illustrated in FIG. 8.

The additional processing 900 can begin with a decision 902 that determines whether a hover over an image is detected. Here, the decision 902 is determining whether a user input indicates that a user input is hovering over one of the images of the set of images being displayed on a display screen. When the decision 902 determines that there is not currently any hover over an image being displayed, a decision 904 can determine whether the timer (set at block 810) has been paused. If the decision 904 determines that the timer is now paused, the timer is un-paused 906. If the decision 904 determines that the timer is not now paused, the block 906 can be bypassed. Following the block 906 or its being bypassed, the additional processing 900 can conclude. In such case, when the additional processing 900 is utilized for some or all of the other processing 814 illustrated in FIG. 8, the processing resumes at the decision 812 to determine whether a time-out has occurred.

On the other hand, when the decision 902 determines that there is currently a hover over an image, the timer can be paused 908. A user advance control can also be displayed 910. The user advance control is a graphical user control element that can be presented on the display screen. The user can interact with the graphical user control element by way of a pointing action to manually initiate an advance request with respect to the set of images. After the user advance control has been displayed 910, a decision 912 can determine whether an advance request has been received. The advance request is a request from the user via the user advance control to advance the set of images. When the decision 912 determines that an advance request has been received, a next set of images can be determined 914. The next set of images can then be displayed 916. The blocks 914 and 916 can respectively correspond to or be the same as the blocks 816 and 818 of the visual presentation process 800. Following the block 916, the additional processing 900 can return to repeat the decision 902 and subsequent blocks.

Another aspect pertains to a presentation of digital product information in an overlay window. A user can initiate display an overlay window and the overlay window can present relevant information concerning a digital product. Advantageously, digital product information can be quickly presented to a user without having to navigate to a new page of a website (e.g., online distribution site, such as an online store).

Figure 10A:
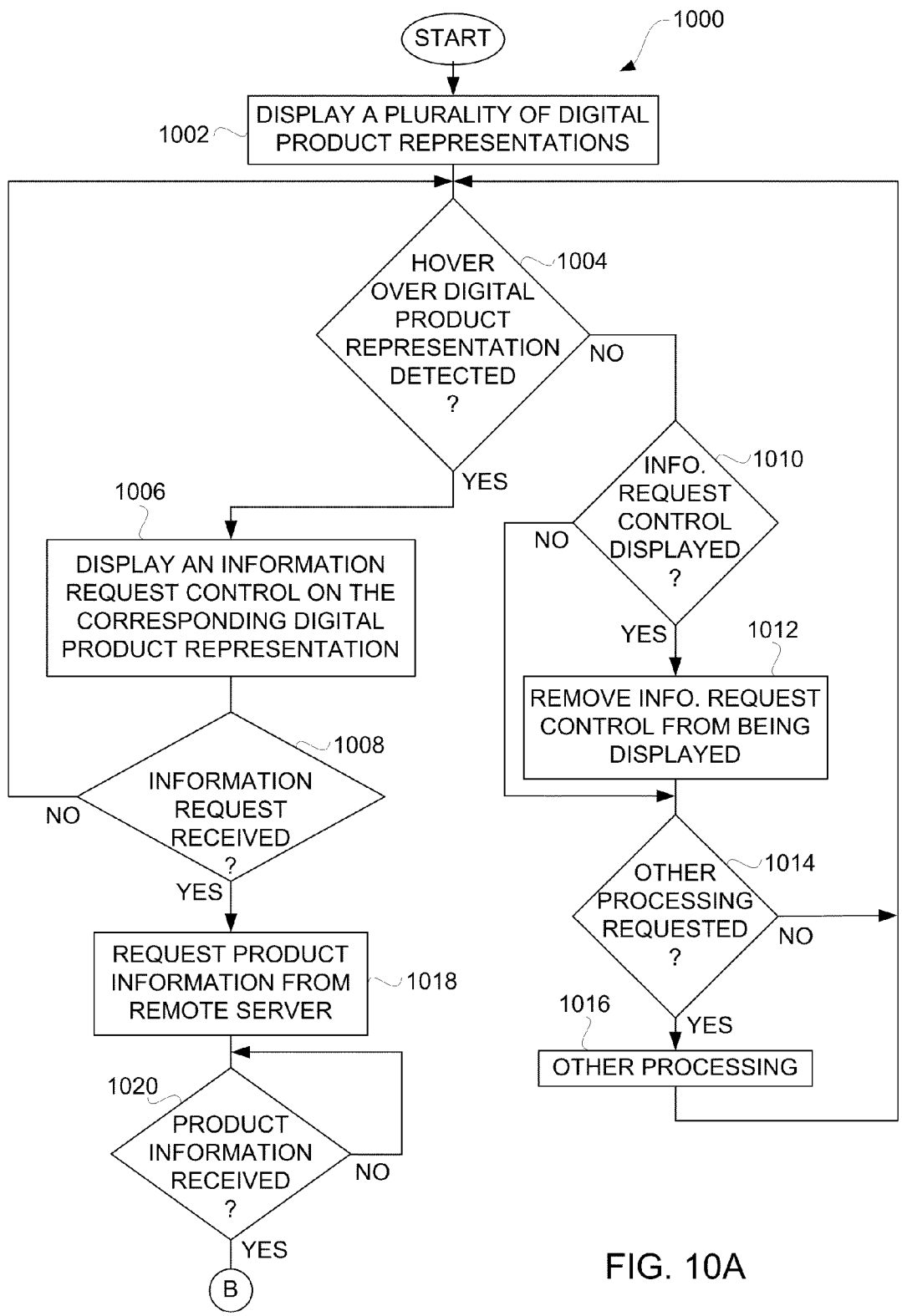
FIGS. 10A and 10B are flow diagrams of an overlay product information process according to one embodiment.
Figure 10B:
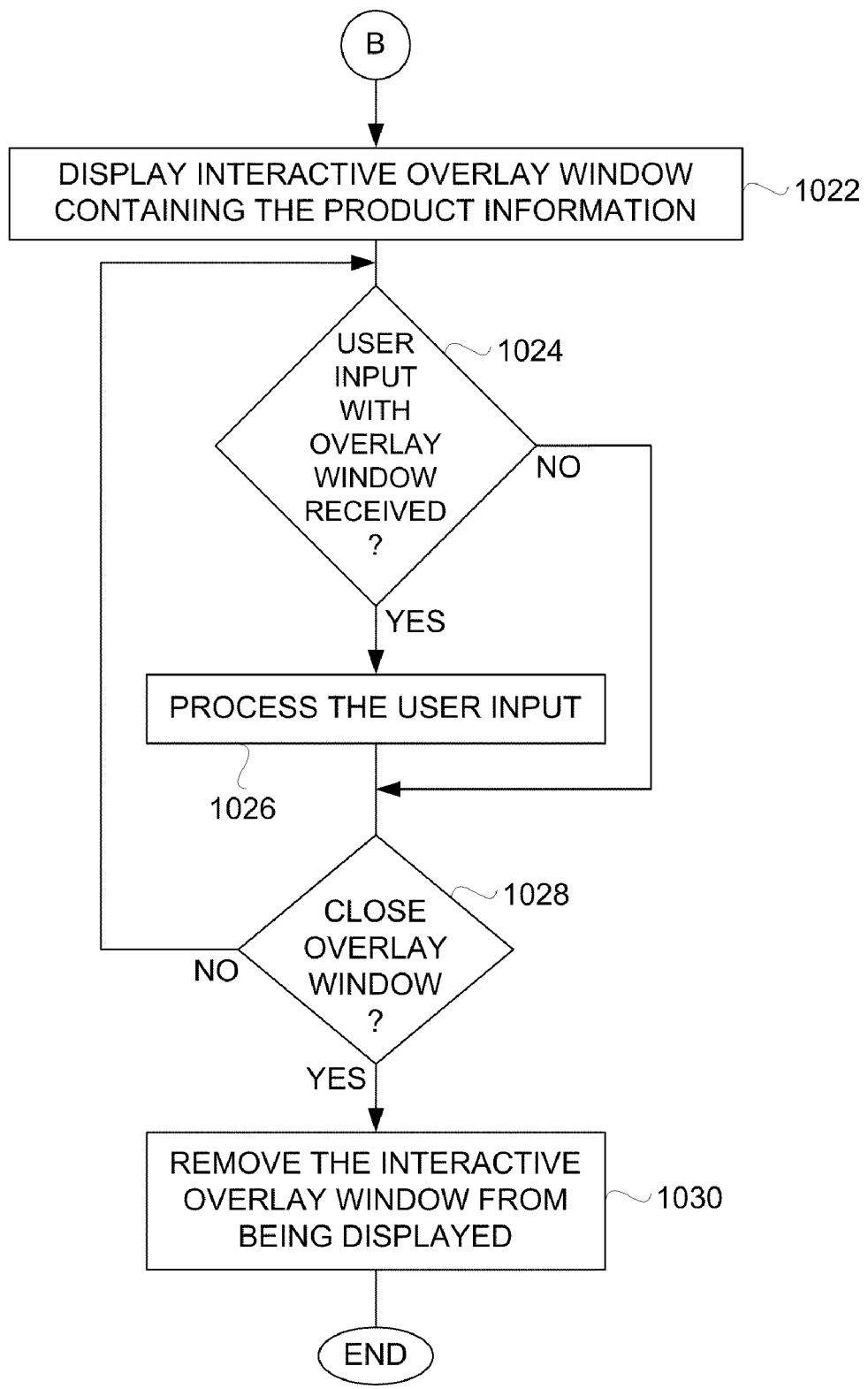

FIGS. 10A and 10B are flow diagrams of an overlay product information process 1000 according to one embodiment. The overlay product information process 1000 is, for example, a computing device, such as the client 1104 illustrated in FIG. 1.

The overlay product information process 1000 can display 1002 a plurality of digital product representations. Here, the plurality of digital product representations are displayed 1002 on a display screen associated with a computing device. As an example, a digital product representation can pertain to an image and/or text that is descriptive of or associated with a corresponding digital product.

Next, a decision 1004 to terms whether a user input is detected as hovering over one of the digital product representations. The user input can be provided by a touch input (e.g., finger) of the user or by a pointing device (e.g., mouse) manipulated by the user. When the decision 1004 determines that a user input is hovering over a particular digital product representation, an information request control can be displayed 1006 on (or proximate to) the corresponding digital product representation. For example, the information request control can be a small graphical indicator that is superimposed on a portion of the particular digital product representation. As an example, the information request control can be displayed as an "i" surrounded by a circle, where the "i" representing information (see FIG. 11C).

After the information request control is displayed 1006, a decision 1008 can determine whether an information request has been received. Here, through use of the information request control, the user of the computing device can request information concerning the particular digital product representation. In one implementation, the user can initiate the information request by "pressing on" or "clicking on" the information request control. In any case, when the decision 1008 determines that an information request has not been received, the overlay product information process 1000 returns to repeat the decision 1004 to again determine whether a user input is hovering over a particular digital product representation.

Alternatively, when the decision 1004 determines that a user input is not hovering over a particular digital product representation, a decision 1010 can determine whether an information request control is currently being displayed. When the decision 1010 determines that an information request control is currently being displayed, the information request control can be removed 1012 from being displayed since the user input is no longer hovering over a particular digital product representation. If the decision 1010 determines that an information request control is not currently being displayed, the block 1012 can be bypassed. Following the block 1012 or its being bypassed, a decision 1014 can than determine whether other processing is requested by the user. When the decision 1014 determines that other processing is requested, other processing 1016 can be performed. Although the embodiment discussed herein concerns digital product representations and obtaining information on such digital products, other processing can be performed and supported by the computing device. Examples of other processing include playback, purchase, preview, browse, or search of digital products. On the other hand, when the decision 1014 determines that other processing is not requested, the other processing 1016 can be bypassed. Following the block 1016 or its being bypassed, the overlay product information process 1000 can returned to repeat the decision 1004.

On the other hand, when the decision 1008 determines that an information request has been received, product information can be requested 1018 from a remote server. Here, the product information is information stored at or accessible to the remote server. The product information concerns the particular digital product that corresponds to the particular digital product representation. After the product information has been requested 1018, a decision 1020 can determine whether the requested product information has been received. When the decision 1020 determines that the requested product information has not yet been received, the overlay product information process 1000 can await such information.

Alternatively, once the decision 1020 determines that the requested product information has been received, an interactive overlay window can be displayed 1022. The interactive overlay window contains the product information that has been received from the remote server. Since the overlay window is interactive, the user of the computing device can interact with the overlay window (e.g., via touch input or pointing device input) to invoke certain actions supported by the overlay window. In this regard, after the interactive overlay window has been displayed 1022, a decision 1024 can determine whether a user input with the overlay window has been received. If the decision 1024 determines that a user input with the overlay window has been received, the user input can be processed 1026. Alternatively, when the decision 1024 determines that a user input with the overlay window has not been received, the block 1026 can be bypassed.

Following the block 1026 or its being bypassed, a decision 1028 determines whether the overlay window should be closed. When the decision 1028 determines that the overlay window should not be closed, the overlay product information process 1000 returns to repeat the decision 1024 and subsequent blocks. On the other hand, when the decision 1028 determines that the overlay window should be closed, the interactive overlay window can be removed 1030 from being displayed. Following the block 1030, the overlay product information process 1000 can end.

Additionally, it should be noted that in one embodiment, the interactive overlay window can be displayed 1022 in a manner such that the interactive overlay window is displayed adjacent to the particular digital product representation. For example, the interactive overlay window can be displayed adjacent the particular digital product representation so that the particular digital product representation is remains visible on the display screen even after the interactive overlay window is displayed. The placement of the interactive overlay window on the display screen can depend on the position of the particular digital product representation within the base window. The interactive overlay window can be placed to the top, left, right or bottom of the particular digital product representation. For example, if the particular digital product representation is towards the left of the display screen, then the interactive overlay window can be displayed adjacent the right side of the particular digital product representation. As another example, if the particular digital product representation is towards the bottom of the display screen, then the interactive overlay window can be displayed adjacent the top side of the particular digital product representation.

The information request control can, in one embodiment, can remain displayed while the overlay window is displayed 1022. It should be noted that, in another embodiment, when the overlay window is displayed 1022, the information request control previously being displayed can be removed from being displayed.

It should also be noted that, in one embodiment, when the interactive overlay window is displayed 1022, the base window that includes the plurality of digital product representations can be rendered inactive. When the base window is inactive, the user cannot interact with the base window until the overlay window is closed. The base window can also be visually denoted as inactive, such as by "graying at" the content of the base window. When the overlay window is subsequently removed 1030 from being displayed, i.e., such as after the overlay window is closed, the base window can be reactivated such that the user can then interact with the base window as desired.

FIGS. 11A-11J are exemplary product review pages according to one embodiment. The product review pages provide a series of illustrations depicting an exemplary usage scenario.

Figure 11A:
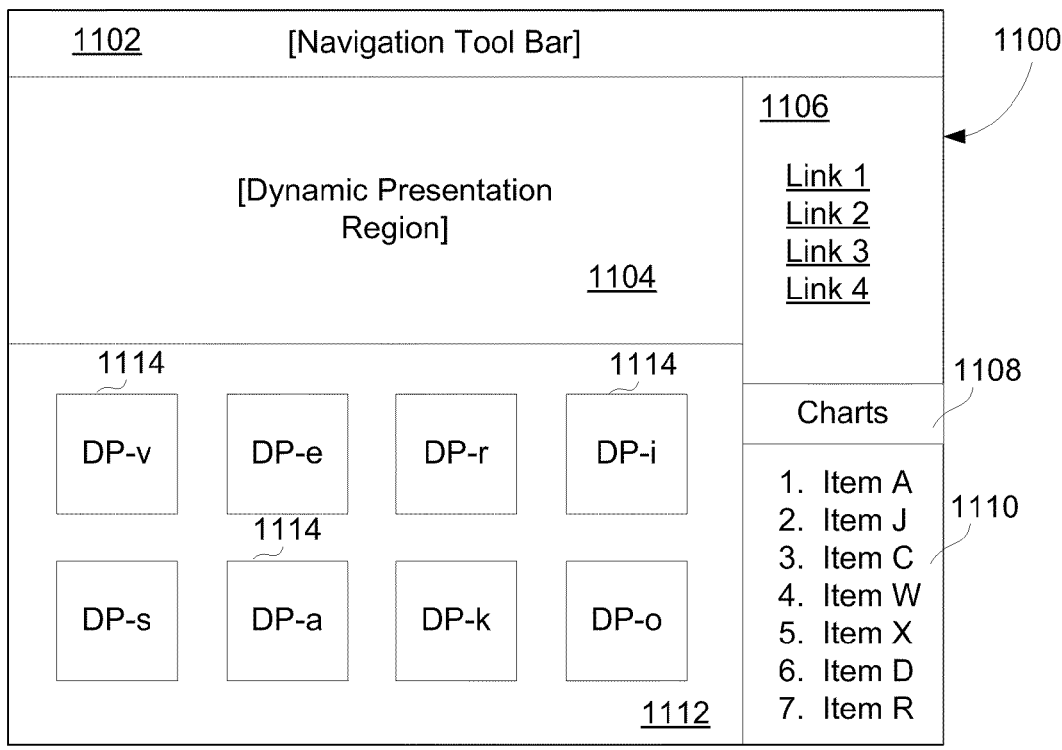
FIGS. 11A-11J are exemplary product review pages according to one embodiment.

FIG. 11A illustrates an exemplary product review page 1100. The product review page 1100 is a graphical user interface window that can be presented on a display screen of a computing device.

The product review page 1100 can include a tool bar 1102 that includes a plurality of different tools or menus for user selection, though such tools or menus are not illustrated in FIG. 11A. The product review page 1100 can also include a dynamic presentation region 1104. The dynamic presentation region 1104 can dynamically present a plurality of different visual representations for a corresponding plurality of digital products. Embodiments suitable for use as the dynamic presentation region 1104 were discussed above with respect to FIGS. 1-9. The product review page 1100 can further include a link region that includes one or more links (e.g. hyperlinks) that allow the user to navigate to different services or content. The product review page 1100 can also include a charts region 1108 that can present one or more charts to a user. The charts are generally ranked lists of digital products. For example, the charts can include one or more of: top pop songs, top rock songs, top albums, top movies, top shows, top applications, etc. As shown in FIG. 11A, for each of the charts being provided in the charts region 1108, a chart listing 1110 can be presented. The chart list 1110 illustrated in FIG. 11A includes seven (7) digital products (denoted as items) in a particular ranking. Still further, the product review page 1100 can include a product presentation region 1112. The product presentation region 1112 can provide a static presentation for a plurality of digital products. In particular, as illustrated in FIG. 11A, the product presentation region 1112 can display a plurality of digital product representations 1114 that represent corresponding digital products. The digital product representations 1114 can include images and/or text representing the corresponding digital products.

Figure 11B:
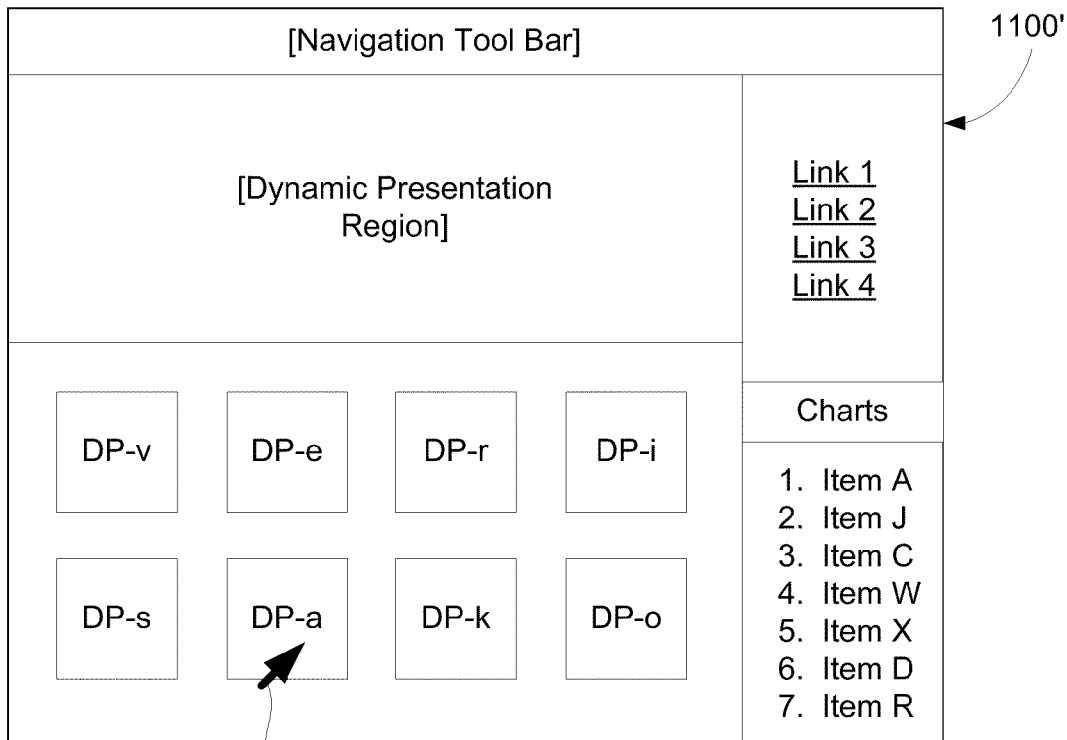

FIG. 11B illustrates an exemplary product review page 1100'. The exemplary product review page 1100' is similar to the product review page 1100 illustrated in FIG. 11A except that a pointing device 1120 is manipulated by a user of the computing device to "hover" over the particular digital product representation 1114 representing the digital product DP-a. This hovering action can be detected by the computing device as a desire for the user to view information concerning the particular digital product.

Figure 11C:
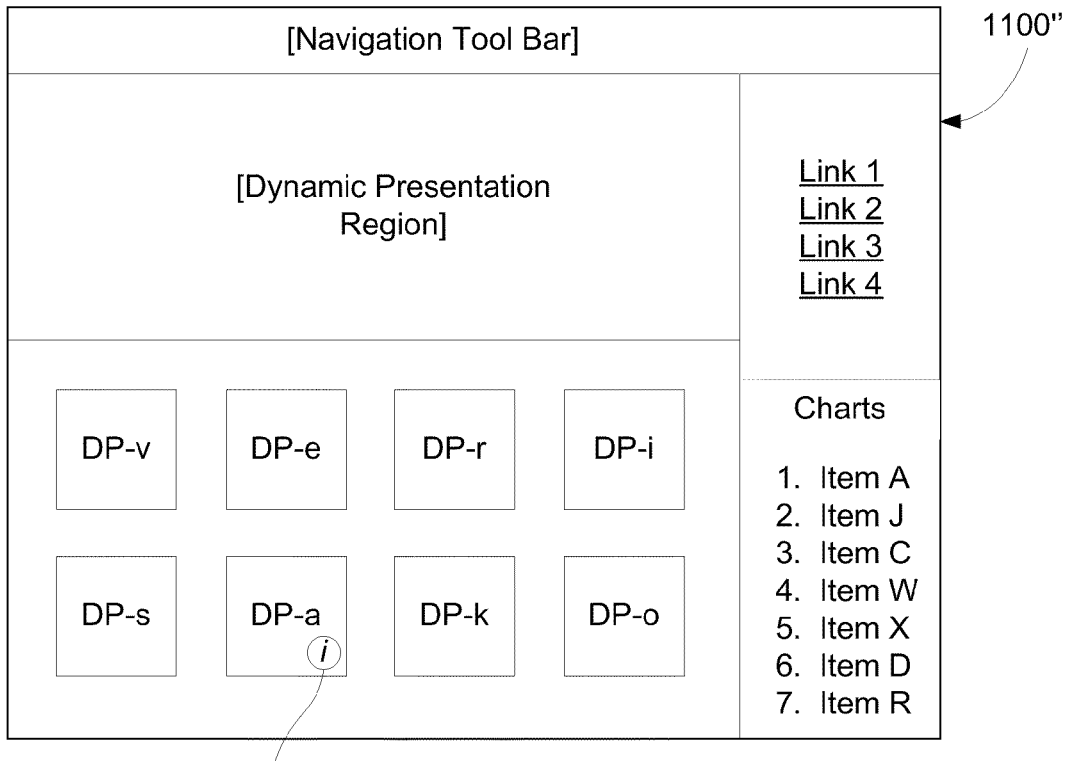

FIG. 11C illustrates an exemplary product review page 1100". The exemplary product review page 1100" is similar to the exemplary product review page 1100' shown in FIG. 11B with the exception that an information request control 1122 is depicted on or over the particular digital product DP-a that was previously identified by the pointing device 1120. In the example illustrated in FIG. 11C, the information request control 1122 is presented as a lowercase "i" within a small circle. However, it should be understood that in other embodiments, the information request control 1122 can have a variety of different shapes, sizes and appearances. The information request control 1122 also need not be provided on or over the corresponding digital product representation 114 but could be provided proximate (e.g., adjacent) thereto.

Figure 11D:
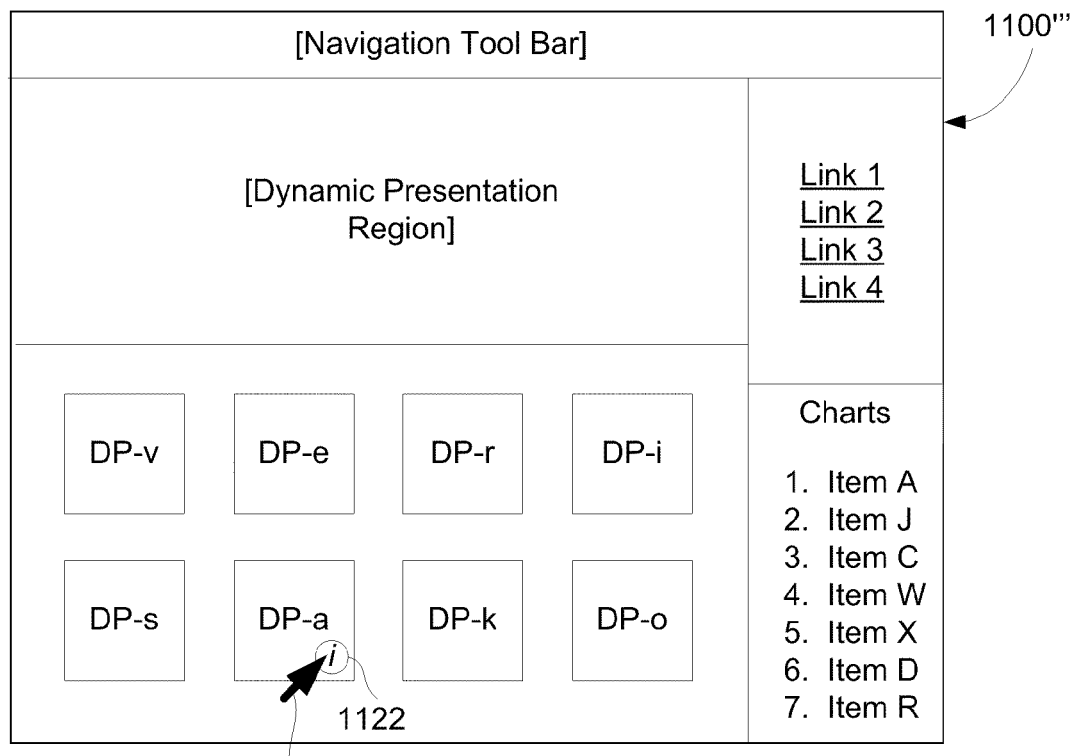

FIG. 11D illustrates an exemplary product review page 1100'''. The exemplary product review page 1100''' is similar to the exemplary product review page 1100" shown in FIG. 11C with the exception that the pointing device 1120' is at or over the information request control 1122 that is depicted on or over the particular digital product DP-a. Here, after the information request control of 1122 is displayed as in FIG. 11C, the user of the computing device can manipulate the pointing device 1120' such that it is at or over the information request control 1122 as in FIG. 11D.

Figure 11E:
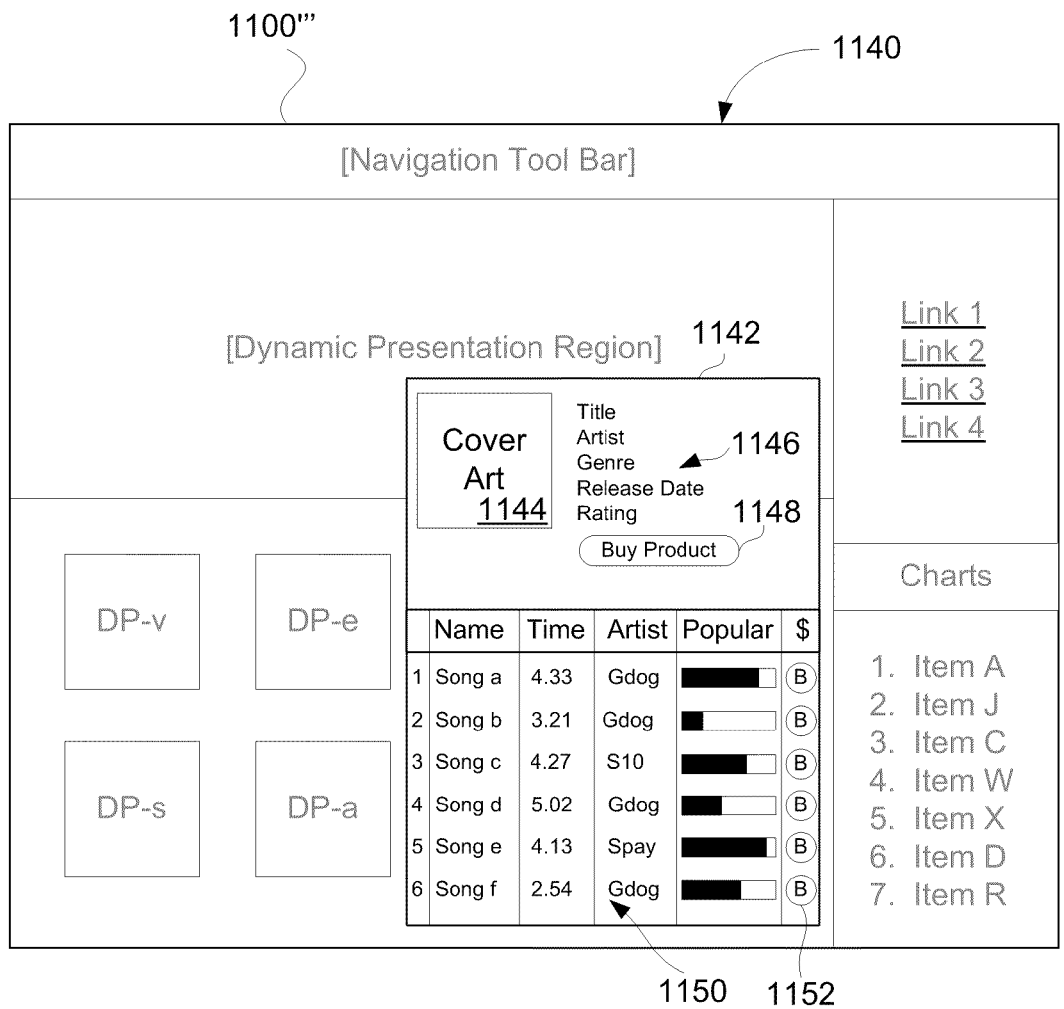

FIG. 11E illustrates an exemplary product review page 1140. The exemplary product review page 1140 includes a background portion and a foreground portion. The background portion is the same or similar to the exemplary product review page 1100" shown in FIG. 11C or the exemplary product review page 1100''' shown in FIG. 11D. The foreground portion can include at least a product overlay window 1142. The exemplary product review page 1140 can be automatically presented when the pointing device 1120' is determined to be at or over the information request control 1122 and a user selection is made (e.g., user selects (e.g., "clicks") the information request control 1122). In one implementation, the background portion of the exemplary product review page 1140 can be inactive while the foreground portion is active. In other words, while the product overlay window 1142 is displayed, the background portion can be inactive. As shown in FIG. 11E, the background portion of the exemplary product review page 1140 can be visually denoted as being inactive, such as be being "grayed-out".

The product overlay window 1142 can be used to display product information pertaining to the particular digital product that was previously identified through use of the pointing device 1120'. In this example shown in FIG. 11E, the particular digital product is an album of music that includes a plurality of songs.

More particularly, in one embodiment, the product overlay window 1142 includes cover art 1144 and descriptive data 1146 associated with the particular digital product. The descriptive data 1146 can, for example, include information descriptive of the particular digital product, such as: title, artist, genre, release date, and/or rating. The overlay window 1142 can also include a buy product control 1148. Selection of the buy product control 1148 enables the user to purchase the particular digital product. In this example, the particular digital product can be an album. The overlay window 1142 can also provide a track identification table 1150 that provides information on the one more tracks that are associated with a particular digital product (e.g. album). As shown in FIG. 11E, the track identification table 1150 can include a listing of songs, with each of the songs being provided in a different row in the track identification table 1150. For each of the songs provided in the listing of songs in the track identification table 1150, there can be displayed (e.g., across a row for each song) in different columns one or more of: name, time (duration), artist, and popularity. Additionally, a buy song control 1152 can also be displayed for each of the songs provided with or adjacent the listing of songs in the track identification table 1150. Selection of the buy song control 1152 enables the user to purchase the corresponding song. The buy product control 1148 and the buy song controls 1152 can be considered acquisition controls, and the track identification table 1150 can be considered a media content region.

Figure 11F:
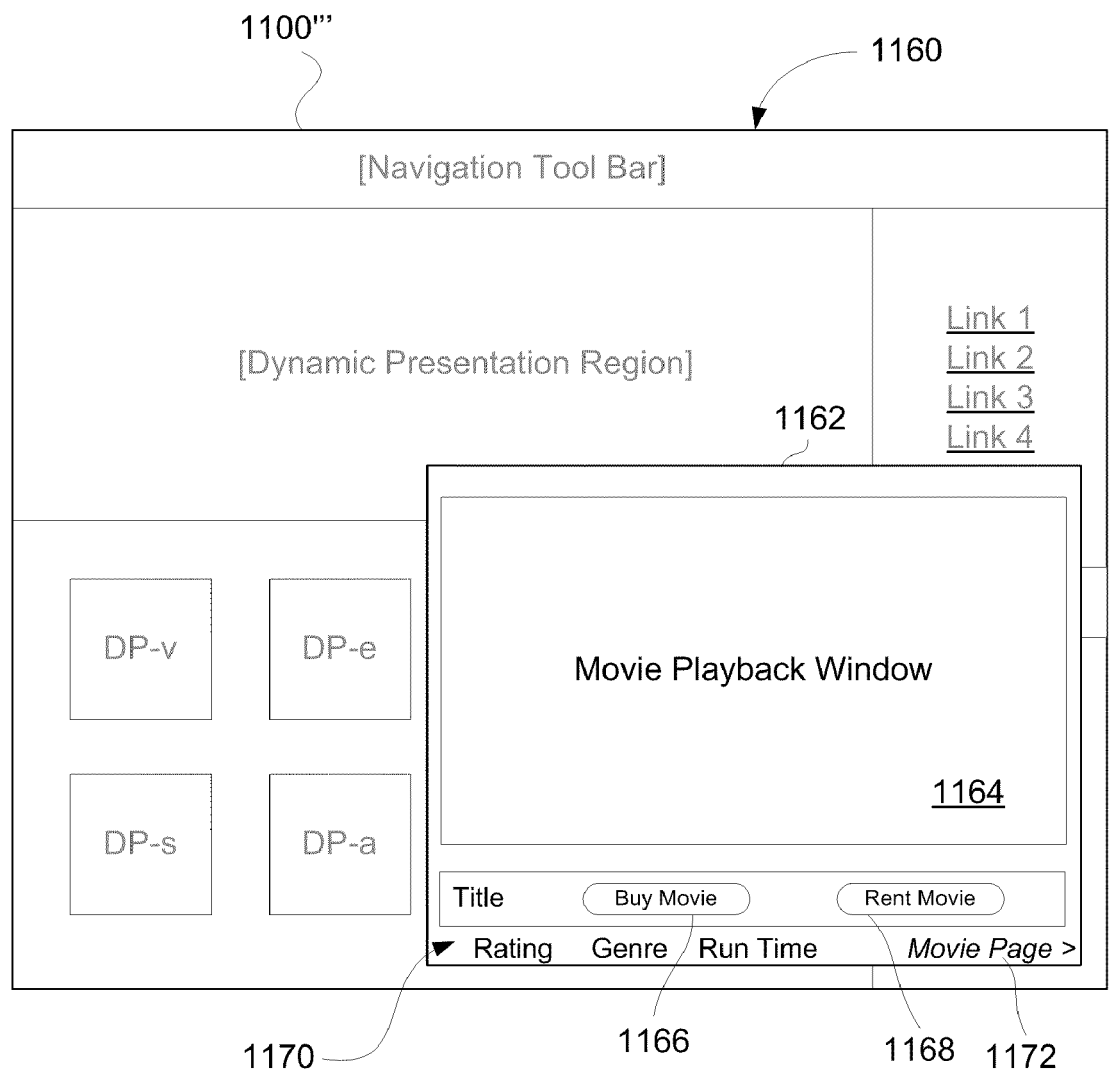

FIG. 11F illustrates another exemplary product review page 1160. The exemplary product review page 1160 includes a background portion and a foreground portion. The background portion is the same or similar to the background portion shown in FIG. 11E. The foreground portion can include at least a product overlay window 1162. The exemplary product review page 1160 can be automatically presented when the pointing device 1120' is determined to be at or over the information request control 1122 and a user selection is made (e.g., user selects (e.g., "clicks") the information request control 1122). In one implementation, the background portion of the exemplary product review page 1160 can be inactive while the foreground portion is active. In other words, while the product overlay window 1162 is displayed, the background portion can be inactive. As shown in FIG. 11F, the background portion of the exemplary product review page 1160 can be visually denoted as being inactive, such as be being "grayed-out".

The product overlay window 1162 can be used to display product information pertaining to the particular digital product that was previously identified through use of the pointing device 1120'. In this example shown in FIG. 11F, the particular digital product is a movie.

More particularly, in one embodiment, the product overlay window 1162 includes a movie playback window 1164 that can present (i.e., play) at least a portion of the movie (e.g., a preview). The presentation of at least the portion of the movie can be automatically initiated when the product overlay window 1162 is displayed. The product overlay window 1162 also includes a buy movie control 1166 and a rent movie control 1166. Selection of the buy movie control 1166 enables the user to purchase the particular digital product. Selection of the rent movie control 1168 enables the user to rent the particular digital product. The movie playback window 1164 can also include descriptive data 1170 associated with the particular digital product. The descriptive data 1170 can, for example, include information descriptive of the particular digital product, such as: title, rating, genre, and/or run time. The overlay window 1162 can also include a movie page link 1172. Selection of the movie page link 1172 causes the exemplary product review page 1160 to be replaced by a product page, namely, a movie page, that provides information primarily related to the movie.

Figure 11G:
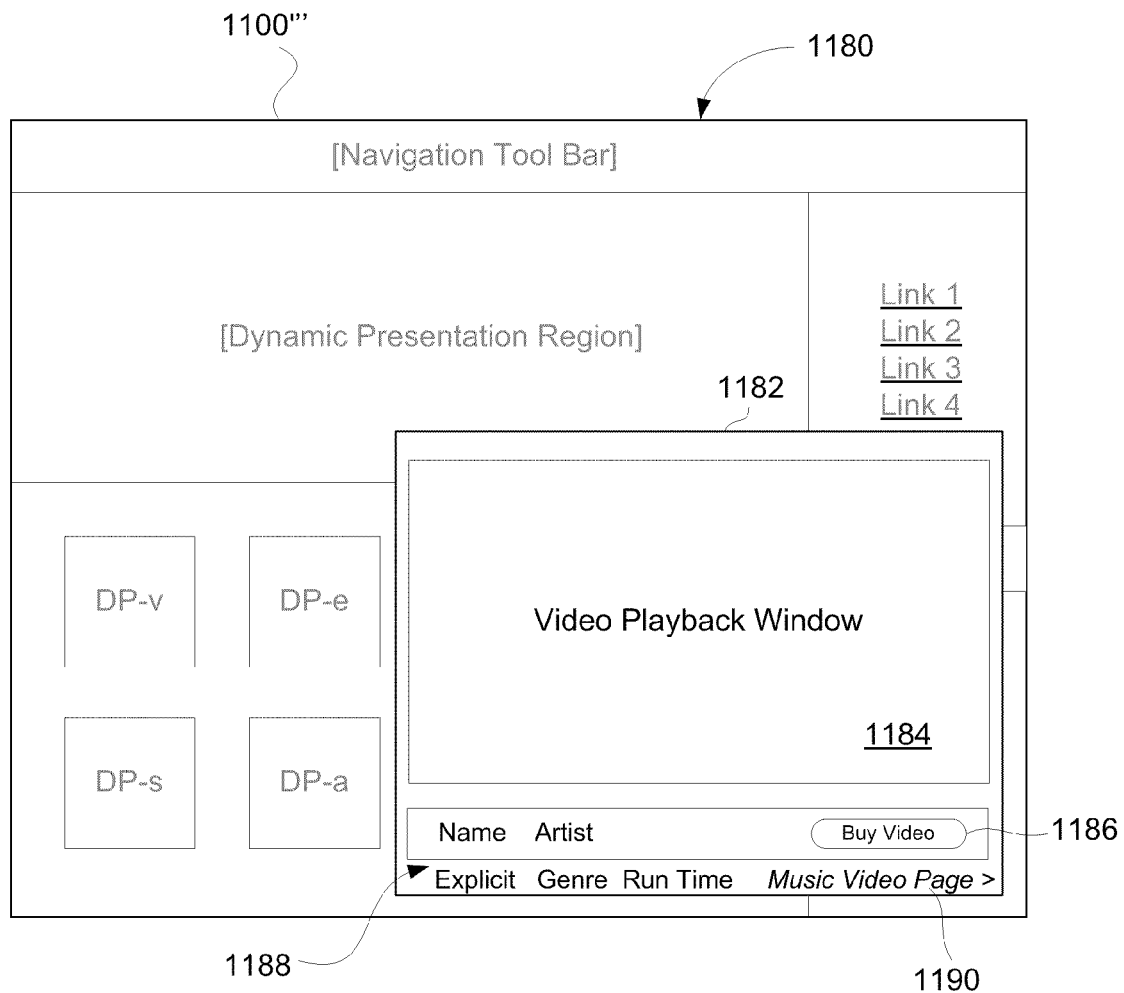

FIG. 11G illustrates another exemplary product review page 1180. The exemplary product review page 1180 includes a background portion and a foreground portion. The background portion is the same or similar to the background portion shown in FIG. 11E. The foreground portion can include at least a product overlay window 1182. The exemplary product review page 1180 can be automatically presented when the pointing device 1120' is determined to be at or over the information request control 1122 and a user selection is made (e.g., user selects (e.g., "clicks") the information request control 1122). In one implementation, the background portion of the exemplary product review page 1180 can be inactive while the foreground portion is active. In other words, while the product overlay window 1182 is displayed, the background portion can be inactive. As shown in FIG. 11G, the background portion of the exemplary product review page 1180 can be visually denoted as being inactive, such as be being "grayed-out".

The product overlay window 1182 can be used to display product information pertaining to the particular digital product that was previously identified through use of the pointing device 1120'. In this example shown in FIG. 11G, the particular digital product is a music video.

More particularly, in one embodiment, the product overlay window 1182 includes a video playback window 1184 that can present (i.e., play) at least a portion of the music video (e.g., a preview). The presentation of at least the portion of the music video can be automatically initiated when the product overlay window 1182 is displayed. The video playback window 1184 also includes a buy video control 1186. Selection of the buy video control 1186 enables the user to purchase the particular digital product. The product overlay window 1184 can also include descriptive data 1188 associated with the particular digital product. The descriptive data 1188 can, for example, include information descriptive of the particular digital product, such as: name, artist, explicit (designator), genre, and/or run time. The overlay window 1182 can also include a music video page link 1190. Selection of the music video page link 1190 causes the exemplary product review page 1190 to be replaced by a product page, namely, a music video page, that provides information primarily related to the music video.

Figure 11H:
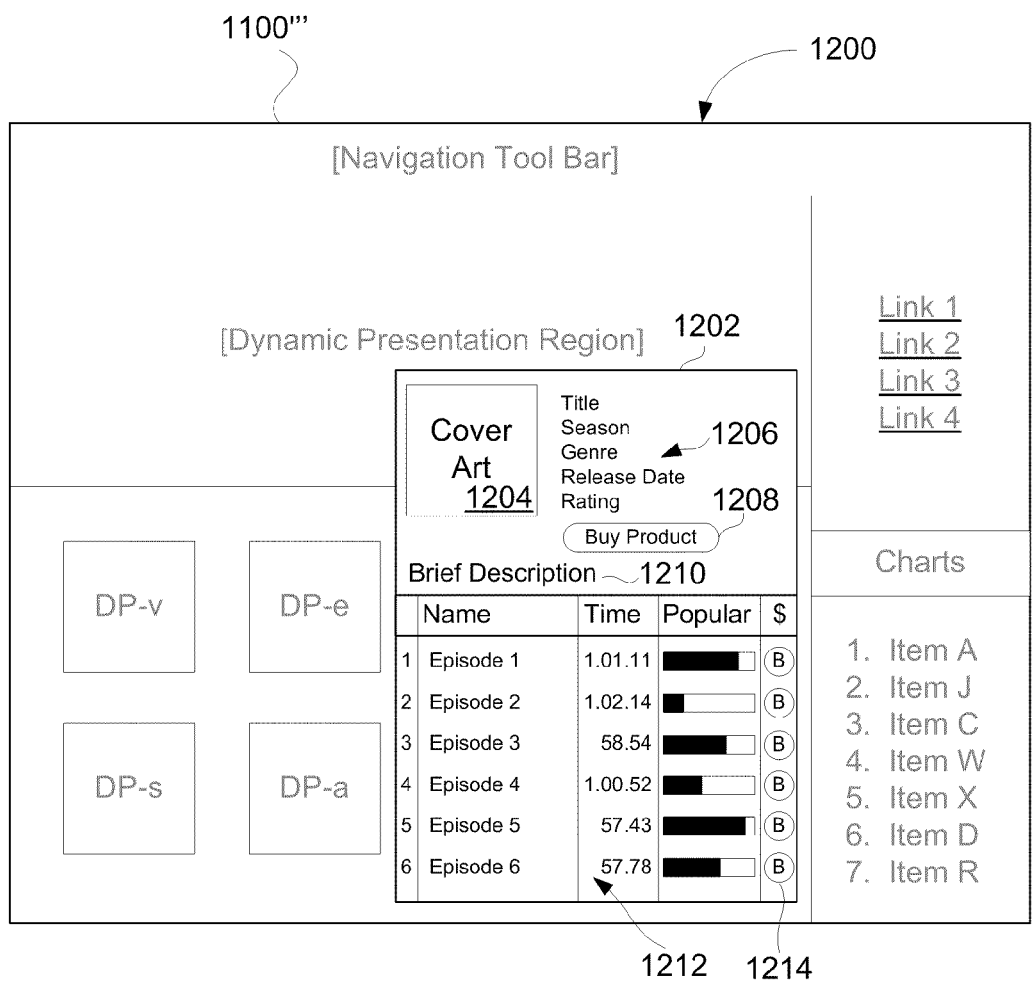

FIG. 11H illustrates an exemplary product review page 1200. The exemplary product review page 1200 includes a background portion and a foreground portion. The background portion is the same or similar to the exemplary product review page 1100" shown in FIG. 11C or the exemplary product review page 1100''' shown in FIG. 11D. The foreground portion can include at least a product overlay window 1202. The exemplary product review page 1200 can be automatically presented when the pointing device 1120' is determined to be at or over the information request control 1122 and a user selection is made (e.g., user selects (e.g., "clicks") the information request control 1122). In one implementation, the background portion of the exemplary product review page 1200 can be inactive while the foreground portion is active. In other words, while the product overlay window 1200 is displayed, the background portion can be inactive. As shown in FIG. 11H, the background portion of the exemplary product review page 1200 can be visually denoted as being inactive, such as be being "grayed-out".

The product overlay window 1202 can be used to display product information pertaining to the particular digital product that was previously identified through use of the pointing device 1120'. In this example shown in FIG. 11H, the particular digital product is a season of episodes, such as television episodes of a television show.

More particularly, in one embodiment, the product overlay window 1202 includes cover art 1204 and descriptive data

1206 associated with the particular digital product. The descriptive data 1206 can, for example, include information descriptive of the particular digital product, such as: title, season, genre, release date, and/or rating. The overlay window 1202 can also include a buy product control 1208. Selection of the buy product control 1208 enables the user to purchase the particular digital product. In this example, the particular digital product can be a season of episodes. The overlay window 1202 can also provide an episode identification table 1212 that provides information on the one more episodes that are associated with a particular digital product (e.g. season of episodes). As shown in FIG. 11H, the episode identification table 1212 can include a listing of episodes, with each of the episodes being provided in a different row in the episode identification table 1212. For each of the episodes provided in the listing of episodes in the episode identification table 1212, there can be displayed (e.g., across a row for each song) in different columns one or more of: name, time (duration), and popularity. Additionally, a buy episode control 1214 can also be displayed for each of the episodes provided with or adjacent the listing of episodes in the episode identification table 1212. Selection of the buy episode control 1214 enables the user to purchase the corresponding episode. The buy product control 1208 and the buy episode controls 1214 can be considered acquisition controls, and the episode identification table 1212 can be considered a media content region.

Additionally, in one embodiment, the episode identification table 1212 can be interactive. For example, a user of the computing device can highlight and/or select one of the episodes in the episode identification table 1212. On selection of one of the episodes, the overlay window 1202 can convert to an episode playback window such as shown in FIG. 11I.

Figure 11I:
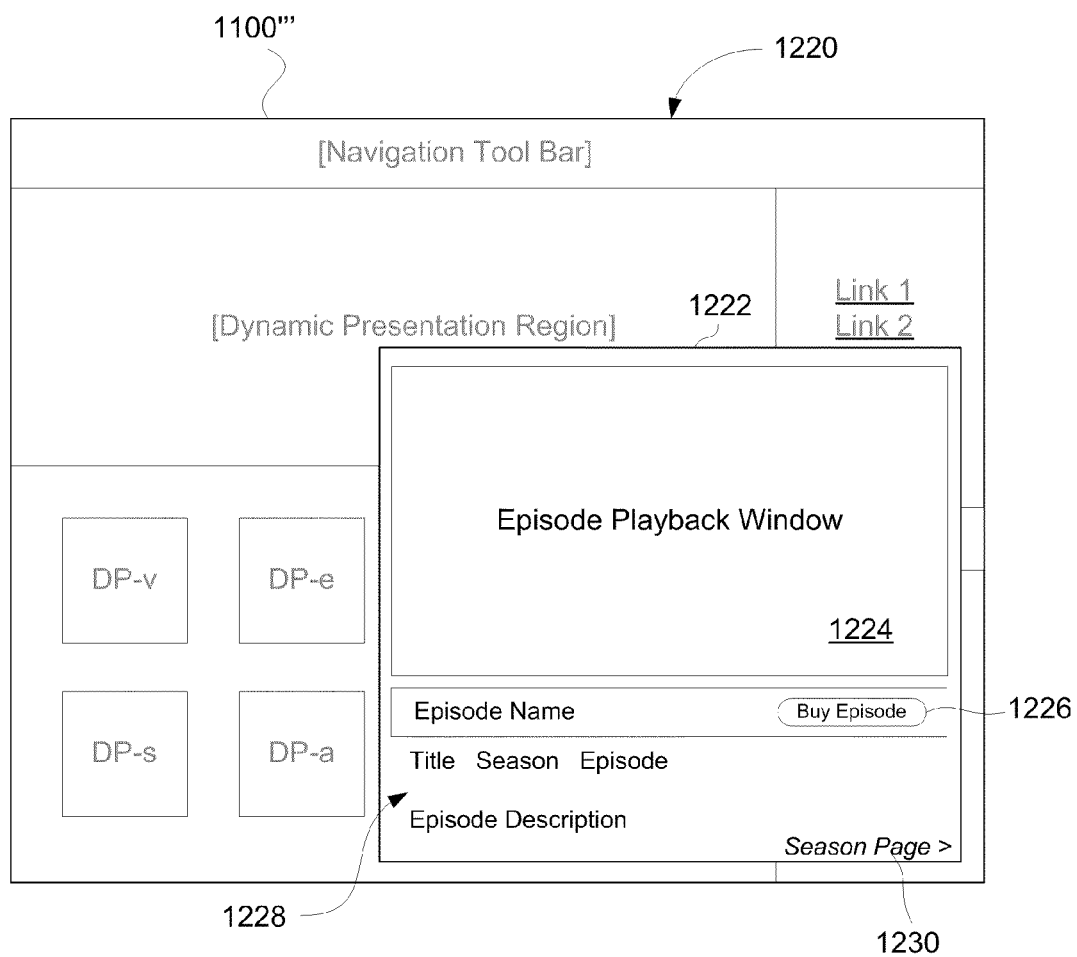

FIG. 11I illustrates another exemplary product review page 1220. The exemplary product review page 1220 includes a background portion and a foreground portion. The background portion is the same or similar to the background portion shown in FIG. 11H. The foreground portion can include at least a product overlay window 1222. The exemplary product review page 1220 can be automatically presented when a user selection is made (e.g., user selects (e.g., "clicks") of one of the episodes in the episode identification table 1212 shown in FIG. 11H. In one implementation, the background portion of the exemplary product review page 1220 can be inactive while the foreground portion is active. In other words, while the product overlay window 1222 is displayed, the background portion can be inactive. As shown in FIG. 11I, the background portion of the exemplary product review page 1220 can be visually denoted as being inactive, such as be being "grayed-out".

The product overlay window 1222 can be used to display product information pertaining to the particular digital product that was previously identified through use of the pointing device 1120'. In this example shown in FIG. 11G, the particular digital product is a particular episode, such as an episode of a television series.

More particularly, in one embodiment, the product overlay window 1222 includes an episode playback window 1224 that can present (i.e., play) at least a portion of the video for an episode (e.g., a preview). The presentation of at least the portion of the video can be automatically initiated when the product overlay window 1222 is displayed. The episode playback window 1224 also includes a buy episode control 1226. Selection of the buy episode control 1226 enables the user to purchase the particular digital product, i.e., particular episode. The product overlay window 1222 can also include descriptive data 1228 associated with the particular digital product. The descriptive data 1228 can, for example, include information descriptive of the particular digital product, such as: title, season, episode and/or episode description. The overlay window 1222 can also include a season page link 1230. Selection of the season page link 1230 causes the exemplary product review page 1220 to be replaced by a product page, namely, a season page, that provides information primarily related to a season of which the particular episode is included.

Figure 11J:
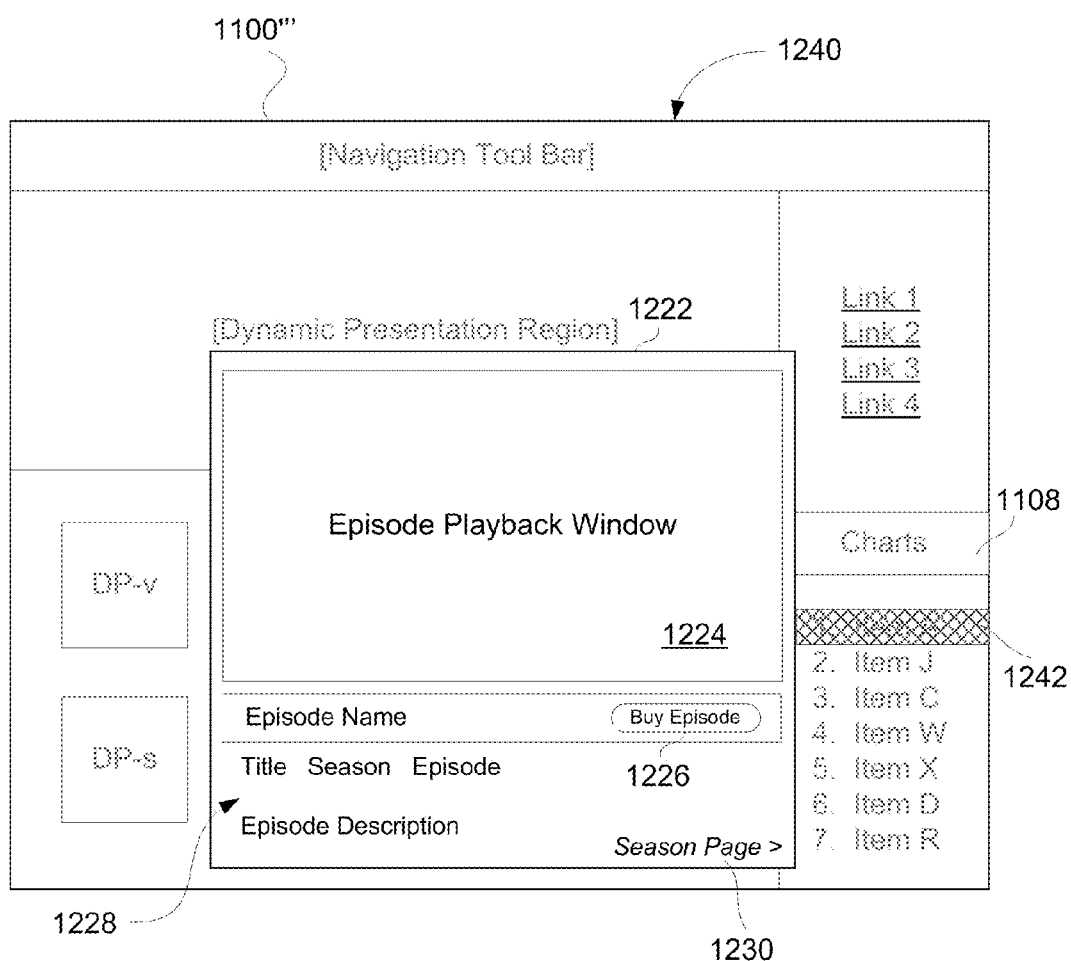

FIG. 11J illustrates another exemplary product review page 1240. The exemplary product review page 1240 includes a background portion and a foreground portion. The background portion is the same or similar to the background portion shown in FIG. 11I. Also, like FIG. 11I, the foreground portion can include at least a product overlay window 1222. However, in this embodiment, a user has previously selected an episode 1242 in the charts region 1108 of the background portion. The product overlay window 1222 can be automatically presented when a user selection is made (e.g., user selects (e.g., "clicks") for the episode 1242. The user selection can be provided through "hover over" to produce an information request control (e.g., information request control 1122) that is selectable as the user selection to cause the product overlay window 1222 to be presented. The exemplary product review page 1222 shown in FIG. 11J can be as described with respect to FIG. 11I. In this example shown in FIG. 11J, the particular digital product is a particular episode, such as an episode of a television series. It should also be noted that, in one embodiment, the product overlay window 1222 can be positioned adjacent the selected episode 1242 in the charts region 1108. Additionally, a buy episode control (not shown) can also be displayed adjacent the episode 1242 being highlighted, thereby facilitating direct purchase of the episode 1242.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for presenting digital media assets on a display screen associated with a computing device, said method comprising:
    identifying a presentation region on the display screen;
    displaying a first graphical image on a primary portion of the presentation region on the display screen, the first graphical image pertaining to a first digital media asset;
    displaying a plurality of graphical images on a secondary portion of the presentation region on the display screen, each of the plurality of graphical images pertaining to a digital media asset, the secondary portion being adjacent the primary portion; and
    automatically advancing through the graphical images being displayed on the first portion and the secondary portion of the presentation region of the display screen, wherein the advancing comprises:
        periodically replacing one of the plurality of graphical images being displayed on the secondary portion with another graphical image, wherein the other one or more of the plurality of graphical images being displayed on the secondary portion are displayed in a different position on the secondary portion; and
        periodically replacing the first graphical image being displayed on the primary portion of the presentation region with another graphical image,
    wherein the replacing of the one of the plurality of graphical images being displayed on the secondary portion with another graphical image comprises an animated effect of sliding the one of the plurality of graphical images being displayed out of the secondary portion while sliding in the secondary portion the another graphical image that replaces the one of the plurality of graphical images being replaced, and
    wherein the replacing of the first graphical image being displayed on the primary portion with another graphical image comprises an animated effect of fading in the another graphical image into the primary portion while fading out the first graphical image from the primary portion.

2. A method as recited in claim 1, wherein the advancing is performed in a vertical direction.

3. A method as recited in claim 1, wherein each of the plurality of graphical images being displayed on the second portion are adjacent to the first graphical image displayed on the first portion.

4. A method as recited in claim 1, wherein the size of the graphical image displayed on the primary portion is larger than the size of any of the one or more graphical images displayed on the secondary portion.

5. A method as recited in claim 1, wherein the graphical images are transmitted to the computing device by a remote server coupled to a network.

6. A method as recited in claim 1, wherein said method further comprises:
    detecting that a user of the computing device causes a user interface (UI) pointing device to hover over one of the graphical images being displayed; and
    ceasing automatic advancing of the graphical images being displayed on the secondary portion of the presentation region of the display screen if the detecting detects that the UI pointing device is hovered over one of the graphical images being displayed.

7. A method as recited in claim 6, wherein said method further comprises:
    presenting an advance control over a portion of one of the graphical images being displayed; and
    activating the advance control to manually incrementally advance through the graphical images.

8. A computer readable medium including at least executable computer program stored thereon for presenting digital assets on a display screen associated with a computing device, said computer readable medium comprising:
    computer program code for identifying a presentation region on the display screen;
    computer program code for displaying a first graphical image on a primary portion of the presentation region on the display screen, the first graphical image pertaining to a first digital asset;
    computer program code for displaying a plurality of graphical images on a secondary portion of the presentation region on the display screen, each of the plurality of graphical images pertaining to a digital asset, the secondary portion being adjacent the primary portion; and
    computer program code for automatically advancing through the graphical images being displayed on the secondary portion of the presentation region of the display screen,
    wherein the computer program code for automatically advancing comprises:
        computer program code for periodically replacing one of the plurality of graphical images being displayed on the secondary portion with another graphical image, wherein the other one or more of the plurality of graphical images being displayed on the secondary portion are displayed in a different position on the secondary portion; and
        computer program code for periodically replacing the first graphical image being displayed on the primary portion of the presentation region with another graphical image,
    wherein the replacing of the one of the plurality of graphical images being displayed on the secondary portion with another graphical image comprises an animated effect of sliding the one of the plurality of graphical images being displayed out of the secondary portion while sliding in the secondary portion the another graphical image that replaces the one of the plurality of graphical images being replaced, and
        wherein the replacing of the first graphical image being displayed on the primary portion with another graphical image comprises an animated effect of fading in the another graphical image into the primary portion while fading out the first graphical image from the primary portion.

9. A computer readable medium as recited in claim 8, wherein the size of the graphical image displayed on the primary portion is larger than the size of any of the one or more graphical images displayed on the secondary portion.

10. A computer readable medium as recited in claim 9, wherein the graphical images are transmitted to the computing device by a remote server coupled to a network.

11. A computer readable medium as recited in claim 10, wherein said computer readable medium further comprises:
computer program code for detecting that a user of the computing device causes a user interface (UI) pointing device to hover over one of the graphical images being displayed; and
computer program code for ceasing automatic advancing of the graphical images being displayed on the secondary portion of the presentation region of the display screen if the detecting detects that the UI pointing device is hovered over one of the graphical images being displayed.

12. A computer readable medium as recited in claim 11, wherein said computer readable medium further comprises:
computer program code for presenting an advance control over a portion of one of the graphical images being displayed; and
computer program code for activating the advance control to manually incrementally advance through the graphical images.

13. A computing device, comprising:
a display device configured to present a display screen;
a user input device configured to received a user input;
a processor coupled to the display device and the user input device, said processor being configured to execute computer program code to select and present graphical images on the display screen of the display device; and
a data storage device configured to store the computer program code for execution by the processor, the computer program code including at least:
computer program code for identifying a presentation region on the display screen;
computer program code for displaying a first graphical image on a primary portion of the presentation region on the display screen, the first graphical image pertaining to a first digital asset;
computer program code for displaying a plurality of graphical images on a secondary portion of the presentation region on the display screen, each of the plurality of graphical images pertaining to a digital asset, the secondary portion being adjacent the primary portion; and
computer program code for automatically advancing through the graphical images being displayed on the secondary portion of the presentation region of the display screen,
wherein the computer program code for automatically advancing comprises:
computer program code for periodically replacing one of the plurality of graphical images being displayed on the secondary portion with another graphical image, wherein the other one or more of the plurality of graphical images being displayed on the secondary portion are displayed in a different position on the secondary portion; and
computer program code for periodically replacing the first graphical image being displayed on the primary portion of the presentation region with another graphical image,
wherein the replacing of the one of the plurality of graphical images being displayed on the secondary portion with another graphical image comprises an animated effect of sliding the one of the plurality of graphical images being displayed out of the secondary portion while sliding in the secondary portion the another graphical image that replaces the one of the plurality of graphical images being replaced, and
wherein the replacing of the first graphical image being displayed on the primary portion with another graphical image comprises an animated effect of fading in the another graphical image into the primary portion while fading out the first graphical image from the primary portion.

14. A computing device, comprising:
a display device configured to present a display screen;
a user input device configured to received a user input;
a processor coupled to the display device and the user input device, said processor being configured to execute computer program code to select and present graphical images on the display screen of the display device; and
a data storage device configured to store the computer program code for execution by the processor, the computer program code including at least:
computer program code for identifying a presentation region on the display screen;
computer program code for displaying a first graphical image on a primary portion of the presentation region on the display screen, the first graphical image pertaining to a first digital asset;
computer program code for displaying a plurality of graphical images on a secondary portion of the presentation region on the display screen, each of the plurality of graphical images pertaining to a digital asset, the secondary portion being adjacent the primary portion; and
computer program code for automatically advancing through the graphical images being displayed on the secondary portion of the presentation region of the display screen,
wherein the computer program code for automatically advancing comprises:
computer program code for periodically replacing one of the plurality of graphical images being displayed on the secondary portion with another graphical image; and
computer program code for displaying the other one or more of the plurality of graphical images being displayed on the secondary portion in a different position on the secondary portion,
wherein the computer program code for periodically replacing of the first graphical image being displayed on the primary portion with another graphical image comprises computer program code for fading in the another graphical image into the primary portion while fading out the first graphical image from the primary portion, and
wherein the computer program code for periodically replacing of the one of the plurality of graphical images being displayed on the secondary portion with another graphical image comprises computer program code for sliding, in an animated manner, the one of the plurality of graphical images being displayed out of the secondary portion while sliding in the secondary portion the another graphical image that replaces the one of the plurality of graphical images being replaced, and
wherein the data storage device further comprises:
computer program code for periodically replacing the first graphical image being displayed on the primary portion of the presentation region with another graphical image;

computer program code for detecting that a user of the computing device causes a user interface (UI) pointing device to hover over one of the graphical images being displayed;

computer program code for ceasing automatic advancing of the graphical images being displayed on the secondary portion of the presentation region of the display screen if the detecting detects that the UI pointing device is hovered over one of the graphical images being displayed;

computer program code for presenting an advance control over a portion of one of the graphical images being displayed; and computer program code for activating the advance control to manually incrementally advance through the graphical images.

* * * * *